United States Patent
Kobayashi

(10) Patent No.: US 8,199,701 B2
(45) Date of Patent: Jun. 12, 2012

(54) RADIO COMMUNICATION DEVICE, AND AD HOC ROUTE INFORMATION ACQUIRING METHOD

(75) Inventor: Hirokazu Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 12/094,035

(22) PCT Filed: Nov. 13, 2006

(86) PCT No.: PCT/JP2006/322530
§ 371 (c)(1),
(2), (4) Date: May 16, 2008

(87) PCT Pub. No.: WO2007/058136
PCT Pub. Date: May 24, 2007

(65) Prior Publication Data
US 2009/0180448 A1  Jul. 16, 2009

(30) Foreign Application Priority Data
Nov. 16, 2005  (JP) .................................. 2005-331883

(51) Int. Cl.
*H04W 4/00* (2009.01)
(52) U.S. Cl. ........ 370/328; 370/338; 370/351; 455/522; 709/239

(58) Field of Classification Search .................. None
See application file for complete search history.

(56) References Cited

U.S. PATENT DOCUMENTS

| | | | | |
|---|---|---|---|---|
| 5,987,011 A | * | 11/1999 | Toh | 370/331 |
| 2002/0010792 A1 | * | 1/2002 | Border et al. | 709/238 |
| 2005/0288008 A1 | * | 12/2005 | Shimizu et al. | 455/422.1 |
| 2008/0095058 A1 | * | 4/2008 | Dalmases et al. | 370/237 |

* cited by examiner

*Primary Examiner* — Nittaya Juntima
*Assistant Examiner* — Khoa Huynh
(74) *Attorney, Agent, or Firm* — Pearne & Gordon LLP

(57) ABSTRACT

A wireless communication device including a local wireless communication interface operable to establish an ad hoc network in at least one local area, and to perform communication with a destination device through the ad hoc network, includes: a route discovery unit operable to discover a communication route to the destination device in the ad hoc network; a wide area wireless communication interface operable to perform wide area wireless communication through a wide area wireless communication network; and a wide area wireless communication receiving environment monitoring unit operable to monitor receiving environment of the wide area wireless communication interface. The wide area wireless communication receiving environment monitoring unit activates the route discovery unit for getting the latest communication route in response to a change of receiving environment of the wide area wireless communication interface.

4 Claims, 21 Drawing Sheets

Fig.3

| TRANSMISSION POWER INFORMATION | IDENTIFIER OF DESTINATION WIRELESS COMMUNICATION DEVICE | IDENTIFIER OF NEXT HOPPING WIRELESS COMMUNICATION DEVICE | NUMBERS OF HOPPING | LIFETIME | EFFECTIVE FLAG |
|---|---|---|---|---|---|
| 30mW | B | X | 2 | 25862 | EFFECTIVE |
|  | X | X | 1 | 24667 | EFFECTIVE |
| 5mW | A | Z | 2 | 14886 | EFFECTIVE |
|  | D | Z | 2 | 9867 | INEFFECTIVE |
|  | Z | Z | 1 | 20221 | EFFECTIVE |
| 1mW | C | Y | 7 | 13955 | EFFECTIVE |
|  | Y | Y | 1 | 30068 | EFFECTIVE |

Fig.5

| IDENTIFIER OF SENDER WIRELESS COMMUNICATION DEVICE | IDENTIFIER OF DESTINATION WIRELESS COMMUNICATION DEVICE | IDENTIFIER OF SEARCHING ROUTE | TRANSMISSION POWER INFORMATION | NUMBER OF TRIAL | COMPLETED TIME |
|---|---|---|---|---|---|
| A | M | 28 | 30mW | 0 | 3286 |
| A | N | 27 | 10mW | 1 | 3228 |
| A | Q | 22 | 1mW | 2 | 3002 |
| B | D | 8 | 10mW | — | 2998 |
| C | Z | 56 | 3mW | — | 3058 |
| D | Y | 122 | 1mW | — | 3290 |

Fig.6

| 0 | 7 | 8 | 12 | 15 | 16 | 23 | 24 | 31 |
|---|---|---|---|---|---|---|---|---|
| MESSAGE IDENTIFIER | | FLAG GROUP | | RESERVATION | TRANSMISSION POWER INFORMATION | | NUMBER OF HOPPING | |
| IDENTIFIER OF ROUTE REQUEST MESSAGE | | | | | | | | |
| IDENTIFIER OF DESTINATION WIRELESS COMMUNICATION DEVICE | | | | | | | | |
| SEQUENCE NUMBER OF DESTINATION WIRELESS COMMUNICATION DEVICE | | | | | | | | |
| IDENTIFIER OF SENDER WIRELESS COMMUNICATION DEVICE | | | | | | | | |
| SEQUENCE NUMBER OF SENDER WIRELESS COMMUNICATION DEVICE | | | | | | | | |

Fig.7

| 0 | 7 | 8 | 9 | 10 11 | 18 | 19 | 23 | 24 | 31 |
|---|---|---|---|---|---|---|---|---|---|
| MESSAGE IDENTIFIER | | FLAG GROUP | | | TRANSMISSION POWER INFORMATION | PREFLEX SIZE | | NUMBER OF HOPPING | |
| IDENTIFIER OF DESTINATION WIRELESS COMMUNICATION DEVICE ||||||||||
| SEQUENCE NUMBER OF DESTINATION WIRELESS COMMUNICATION DEVICE ||||||||||
| IDENTIFIER OF SENDER WIRELESS COMMUNICATION DEVICE ||||||||||
| LIFETIME ||||||||||

Fig.9

| IDENTIFIER OF SENDER WIRELESS COMMUNICATION DEVICE | IDENTIFIER OF DESTINATION WIRELESS COMMUNICATION DEVICE | IDENTIFIER OF SEARCHING ROUTE | TRANSMISSION POWER INFORMATION | NUMBER OF TRIAL | COMPLETED TIME |
|---|---|---|---|---|---|
| D | Y | 122 | 1mW | 0 | 3795 |
| A | M | 28 | 30mW | — | 3791 |
| A | N | 27 | 10mW | — | 3732 |
| A | Q | 22 | 1mW | — | 3507 |
| B | D | 8 | 10mW | — | 3503 |
| C | Z | 56 | 3mW | — | 3563 |

Fig.15

| INFORMATION OF ACQUIRING WIDE AREA WIRELESS COMMUNICATION RECEIVING ENVIRONMENT | TRIGGER CONDITION |
|---|---|
| BASE STATION IDENTIFIER | CHANGE OF IDENTIFIER |
| RECEIVED ELECTRIC FIELD STRENGTH | DIFFERENCE OF RECEIVED ELECTRIC FIELD STRENGTH EXCEEDS 10dBm |

Fig.17

| INFORMATION OF ACQUIRING WIDE AREA WIRELESS COMMUNICATION RECEIVING ENVIRONMENT | TRIGGER CONDITION |
|---|---|
| TRANSMISSION POWER INFORMATION | CHANGE OF IDENTIFIER TRANSMISSION POWER EXCEEDS 3dB |

Fig.19

| IDENTIFIER OF NEARBY WIRELESS COMMUNICATION DEVICE | RECEIVED ELECTRIC FIELD STRENGTH OF NEARBY NOTICE |
|---|---|
| A | 10dB |
| B | 12dB |

Fig.20

| IDENTIFIER OF NEARBY WIRELESS COMMUNICATION DEVICE | RECEIVED ELECTRIC FIELD STRENGTH OF NEARBY NOTICE |
|---|---|
| A | 15dB |
| B | 8dB |

RADIO COMMUNICATION DEVICE, AND AD HOC ROUTE INFORMATION ACQUIRING METHOD

TECHNICAL FIELD

The present invention relates to a wireless communication device useful in a wireless ad hoc network system and a method of acquiring route information useful in the system.

BACKGROUND OF THE INVENTION

Recently it becomes possible to exchange electronic mail or data and utilize the Internet from a wireless communication device in an office, on a street corner or in a public transportation, accompanying diversification of wireless communication devices.

It is premise that such wireless communication utilizes an infrastructure like a mobile telephone network or a local area network (LAN).

On the other hand, an ad hoc network becomes paid attention. This network temporarily establishes a network for wireless communication devices existed in the neighborhood to make them communicate together without using such infrastructure.

The ad hoc network is able to make wireless communication devices communicate together by connecting multiple stages of some wireless communication devices even if one wireless communication device can not directly communicate an arbitrary other communication device.

Hence, the network needs a process of establishing a route among wireless communication devices, which makes a decision of transferring data from one wireless communication device to other wireless communication device as a communication partner via an appropriate route.

As a communication method using the conventional ad hoc network, the non-patent document 1 discloses the ad hoc on demand distance vector method (hereinafter simply referred to as "AODV method"). This method finds a hopping route as the shortest distance to a communication partner by searching a route when a communication request is occurred in a communication device that does not hold information of a route to a destination.

In the AODV method, a communication device starts searching a route if a communication device does not an existed effective route when it transmits a data packet to other communication device as a communication partner. Then, the communication device broadcasts a route request message including the sequence number of itself, the sequence number of other communication device as a communication partner and an identifier for searching a route.

Other wireless communication device adjacently existed establishes a reverse route for the communication device that directly transmitted a route request message which the device had received if it has not sufficiently new information of a route to the other wireless communication device as a communication partner. Then, the other wireless communication device broadcasts a further route request message. But, it does not broadcast a route request message that has been already received.

The other wireless communication device as a communication partner or a wireless communication device having sufficient new information of a route to a destination wireless communication device, sends a route response message in which the sequence number of a destination wireless communication device is stored, to the wireless communication device which sent forward the route request message via unicast.

The wireless communication device which received the route request message updates route information which it has by itself based on information within the route request message and sends forward the route request message to the wireless communication device which produced the route request message via the reverse route in case when the sequence number of a communication partner is updated or numbers of hopping to a communication partner is small though the sequence number is the same.

When the request response message reaches the wireless communication device which produced the route request message, the route to the wireless communication device as a communication partner is established.

This sequential process records information of wireless communication devices into each of relay wireless communication devices. This information of wireless communication devices becomes a next hopping for sending a data packet to a destination wireless communication device. Each of relay wireless communication devices relays a data packet based on the route information from the wireless communication device as a sender to the wireless communication device as a communication partner.

In the AODV method, a route is searched only at the time when route information is needed for communication, bringing an advantage of reducing a network load due to control signals such as a route request message and a processing load burdened to a wireless communication device. Further, this method has other advantage in that an overhead for route information is not reduced since there is no need of mounting the route information to a packet header, keeping a constant length of a packet header even if the numbers of relay wireless communication devices to a communication partner are increased.

Otherwise, the patent document 1 discloses a method of designating a power every hopping. In this method, a wireless communication device regularly sends route information held by itself to other devices within an ad hoc network and records the update route information based on other route information acquired from other wireless communication devices. When performing communication, the device stores the information of a route to a destination wireless communication device, and sends it to relay wireless communication devices with transmission power information for them.

In the method of designating a power every hopping, a device makes a decision about whether a communication data property is to emphasize a transmission time delay or a frequency utilization rate, and stores the result of the decision into a packet header. The device calculates a route based on the information obtained from a routing table held by itself depending on the transmission data property. As the result of the calculation, the device stores identifiers for all other wireless communication devices relaying a data packet to be transmitted and transmission power information for each of wireless communication devices into a route information field within the packet header and sends them to a next hopping wireless communication device.

When each of relaying wireless communication devices receives the data packet of which a communication partner is designated by the original wireless communication device itself, it picks up a sending forward route from the route information stored in the route information field within the data packet and a transmission power along the sending forward route. Then, it sets the picked route information field to be a route information field of the data packet as being transmitted. Further, it sets a communication partner for sending the data packet to be a next wireless communication device along the picked route.

Then, the relaying communication device adds an operation of sending the data packet from the original wireless communication device itself into a sending forward history about the received data packet, stores it into a sending forward history field in the data packet to be transmitted and copies a data portion from the received data packet. Finally, it transmits the data packet by the transmission power which is designated via the received route information regarding the data packet.

The method of designating a power every hopping has an advantage of selecting an appropriate route in response to each of verities of telecommunication data.

Patent Document 1: Japanese issued patent No. 3585790
Non Patent Document 1: C. Perkins, E. Royer, S. Das. "Ad hoc On-Demand Distance-Vector (AODV) Routing". Request for Comments: 3561, Internet Engineering Task Force (IETF), July 2003.

DISCLOSURE OF THE INVENTION

Problems to be Solved by the Invention

In the AODV method, however, a power consumed for data telecommunication becomes constant since a predetermined transmission power is used for searching a route and data is transmitted based on the route information obtained by this route searching. Hence, it is difficult to search a power saved route which connects wireless communication devices for relaying data and makes them communicate together under a saved power as much as it can in considering power consumption of wireless communication devices. This difficulty has a disadvantage in that data is transmitted with an excessive transmitting power, worsening power efficiency.

Further, the above method has other disadvantage of deteriorating frequency usage efficiency since a wireless communication device irrelevant to specific communication receives this communication performed among other wireless communication devices, and it cannot transmit its data with the same frequency.

Further, the above method has yet other disadvantage of a sluggish response when changing topology in an ad hoc network since a wireless communication device only searches a route when communication request and does not regularly update route information.

In the method of designating a power every hopping, a data packet includes information of all routes to a destination wireless communication device, bringing further disadvantage of increasing overheads because of expanding route information included in a data packet if numbers of relay wireless communication devices are increased.

Further, in the method of designating a power every hopping, relay wireless communication devices relay data with a transmission power obtained from route information indicated in a received data packet, or other transmission power re-calculated based on the route information owned by it. Hence, it has yet other disadvantage of unfair resource consumption within an ad hoc network since a transmission power for a relay wireless communication device relaying a data packet gets to be larger than a transmission power transmitted by the original wireless communication device which started data communication.

In order to overcome these issues, the present invention is to provide a wireless communication device that holds fairness of transmission powers among wireless communication devices within an ad hoc network and reduces a processing load and power consumption burdened to wireless communication devices.

Means to Solve the Problem

According to an aspect of the invention, a wireless communication device includes a local wireless communication interface performing wireless communication within at least one local area and establishes an ad hoc network via the local wireless communication interface. The wireless communication device further includes: a route discovery transmission power determining unit for setting a minimum transmission power to be used for transmitting a route request message in response to a transmission data property when searching a communication route in the ad hoc network; a route discovery unit for searching a communication route by transmitting the route request message with the minimum transmission power if a communication route to a destination in the ad hoc network is not established when starting the communication; a route discovery transmission power changing unit that incrementally increases a usable transmission power for transmitting the route request message if a communication route is not found as the result of searching a communication route with the minimum transmission power; and a route information memory unit that memorizes a found communication route as the result of searching a communication route as well as a transmission power to be used for transmitting the route request message when searching the communication route.

In the above aspect of the invention, the wireless communication can obtain a power saved route in response to a communication data property without regularly exchanging route information within an ad hoc network. Further, the wireless communication can obtain a power saved route that holds fairness among wireless communication devices on the route since all wireless communication devices from a sender to a communication partner can acquire route information that enables them to send forward data with the same transmission power.

Further, in the aspect of the invention, the communication device may include the route discovery transmission power determining unit for setting the minimum transmission power to be a normal transmission power if the communication data is data being requested as instantaneously sent to the communication partner. Here, the data being requested as instantaneously sent to a communication partner may include at least one of telephone call data and emergency message data. More specifically, the data being requested as instantaneously sent to a communication partner may include data that needs a real time property, as continuously and routinely reaching a destination like a voice message during telephone call. The data may further include data having a real time property being requested as instantaneously sent to a communication partner such as an emergency message.

In the above structure, the wireless communication device can acquire a route having a small numbers of hopping of relay wireless communication devices if data communication is required as slowly delayed.

Further, in the aspect of the invention, the communication device may include the route discovery transmission power determining unit for setting the minimum transmission power to be a transmission power lower than the normal transmission power if the communication data is data not being requested as instantaneously sent to a communication partner. Here, the data not being requested as instantaneously sent to a communication partner is, for example, data that does not need a real time property such as data handled in a file transfer, a mail communication and WEB browsing.

In the above structure, the wireless communication device can acquire a route sending data to a destination with a small transmission power if data communication is not required as slowly delayed.

In the aspect of the invention, the wireless communication device may further include: a wide area wireless communication interface for performing communication with a wide area wireless communication system: and a wide area wireless communication receiving environment monitoring unit for updating route information in the ad hoc network by activating the route discovery unit if a change of receiving environment in the a wide area wireless communication system is detected.

In this structure, the wireless communication device can quickly update route information in response to a topology change since the device searches a route by estimating a topology change in response to change of a circumferential environment.

Here, the change of receiving environment may be a change of a base station connected via the wide area wireless communication system.

In this structure, the wireless communication device can quickly update route information in response to a topology change since the device searches a route by estimating a topology change in response to the change of a base station.

In the aspect of the invention, the wide area wireless communication receiving environment monitoring unit in the wireless communication device may further include: a unit for setting acquisition of information of a wide area wireless communication receiving environment that sets the receiving environment for activating the route discovery unit and its trigger condition; and a wide area wireless communication environment information collecting unit for collecting information for monitoring the receiving environment. The route information in the ad hoc network may be updated by activating the route discovery unit if the trigger condition is satisfied.

In this structure, the wireless communication device of the invention can quickly update route information in response to a topology change since the device searches a route by estimating a topology change in response to a change of a receiving environment.

Here, the information for monitoring the receiving environment may be the strength of an electric field of a signal received from a base station in the wide area wireless communication system.

In this structure, the wireless communication device of the invention can quickly update route information in response to a topology change since the device searches a route by estimating a topology change in response to a change of a circumferential environment due to a change of quality of a signal from a base station.

In the aspect of the invention, the information for monitoring the receiving environment in the wireless communication device may be information of a transmission power control performed by the base station in the wide area wireless communication system.

In this structure, the wireless communication device of the invention can quickly update route information in response to a topology change since the device searches a route by estimating a topology change in response to a change of a circumferential environment itself due to a change of a transmission power to a base station.

Further, in the aspect of the invention, the communication wireless device may enable a user to set the receiving environment and the trigger condition in the unit for setting acquisition of information of a wide area wireless communication receiving environment.

In this structure, a user can change the condition of updating a route in the wireless communication device depending on using status.

In the aspect of the invention, the wireless communication device may further include: a short-distance wireless communication interface that performs short-distance wireless communication: and a nearby wireless communication device monitoring unit for estimating a positional relationship between the wireless communication device and a wireless communication device adjacently existed, based on the information obtained from the short-distance wireless communication interface and updates route information in the ad hoc network by activating the route discovery unit if the positional relationship is changed.

In this structure, the wireless communication device of the invention can quickly update route information in response to a topology change since the device searches a route by estimating a topology change in response to a change of a circumferential environment.

Here, the information obtained from the short-distance wireless communication interface may be the strength of an electric field of a signal received from a wireless communication device adjacently existed.

In this structure, the wireless communication device of the invention can quickly update route information in response to a topology change since the device searches a route by estimating the positional relationship based on the strength of the received electric field and estimating a topology change in response to the change of the positional relationship of the communication device adjacently existed, while any specific device for identifying such position is not mounted in the wireless communication device.

In the aspect of the invention, the information obtained from the short-distance wireless communication interface of the wireless communication device may be positioning information.

In this structure, the wireless communication device of the invention can quickly update route information in response to a topology change since the device search a route by managing the positional relationship and estimating a topology change in response to the change of the positional relationship of the communication device adjacently existed, while any specific devices for identifying such position are not mounted in the wireless communication device.

According to other aspect of the invention, it relates to a method of acquiring ad hoc route information of a wireless communication device. The wireless communication device includes a local wireless communication interface performing wireless communication within at least one local area and establishes an ad hoc network via the local wireless communication interface.

The method comprises: a step of setting a minimum transmission power to be used for transmitting a route request message in response to a transmission data property when searching a communication route in the ad hoc network; a step of searching a communication route with the minimum transmission power if a communication route to a destination in the ad hoc network is not established when starting communication; a step of incrementally increasing a usable transmission power for transmitting the route request message if a communication route is not found as the result of searching a communication route with the minimum transmission power; and a step of memorizing a found communication route as the result of searching a communication route as well as a transmission power to be used for transmitting the route request message when searching the communication route.

In the above aspect of the invention, the method of acquiring route information can obtain a power saved route in response to a communication data property without regularly exchanging route information within the ad hoc network. Further, the method can obtain a power saved route that holds fairness among wireless communication devices on the route since all wireless communication devices from a sender to a communication partner can acquire route information that enables them to send forward data with the same transmission power.

Further, in the above other aspect of the invention, the method may further include: a step of setting the minimum transmission power to be a normal transmission power if the communication data is data being requested as instantaneously sent to the communication partner. Here, the data being requested as instantaneously sent to a communication partner may include at least one of telephone call data and emergency message data. More specifically, the data being requested as instantaneously sent to a communication partner may include data that needs a real time property, as continuously and routinely reaching a destination such as a voice message during telephone call. The data may further include data having a real time property being requested as instantaneously sent to a communication partner such as an emergency message.

The above method of acquiring ad hoc route information can acquire a route having a small numbers of hopping of the relay wireless communication devices if it is required that data communication is slowly delayed.

Further, in the above other aspect of the invention, the method may further includes: a step of setting a transmission power lower than a normal transmission power as the minimum transmission power if the communication data is a data not being requested as instantaneously sent to a communication partner. Here, the data not being requested as instantaneously sent to a communication partner is, for example, a data that does not have a real time property such as a data handled in a file transfer, a mail communication and WEB browsing.

The above method of acquiring ad hoc route information of the invention can acquire a route that sends data to a communication partner with a small transmission power if data communication is not required as being slowly delayed.

In the above other aspect of the invention, the method of acquiring ad hoc route information may further comprise: having a wide area wireless communication interface for performing communication with a wide area wireless communication system: monitoring a receiving environment of the wide area wireless communication system: and updating route information of the ad hoc network by activating searching a communication route if a change of receiving environment is detected.

The above method of acquiring ad hoc route information can quickly update route information in response to a topology change since the method searches a route by estimating a topology change in response to a change of a circumferential environment.

Here, the change of receiving environment may be a change of a base station connected via the wide area wireless communication system.

The above method of acquiring ad hoc route information of the invention can quickly update route information in response to a topology change since the method searches a route by estimating a topology change in response to a change of a base station.

In the above other aspect of the invention, the method of acquiring ad hoc route information may further comprise: collecting information for monitoring the receiving environment based on the receiving environment for activating the route searching and its trigger condition which are set in advance: and updating route information in the ad hoc network followed by activating the route searching if the trigger condition is satisfied.

The above method of acquiring ad hoc route information can quickly update route information in response to a topology change since the method searches a route by estimating a topology change in response to a change of a receiving environment.

Here, the information for monitoring the receiving environment may be the strength of an electric field of a signal received from a base station in the wide area wireless communication system.

The above method of acquiring ad hoc route information can quickly update route information in response to a topology change since the method searches a route by estimating a topology change in response to the change of the circumferential environment due to a change of quality of a signal from the base station.

In the above aspect of the invention, the information for monitoring the receiving environment may be information regarding a transmission power control performed by the base station in the wide area wireless communication system.

The above method of acquiring ad hoc route information can quickly update route information in response to a topology change since the method searches a route by estimating a topology change in response to a change of a circumferential environment of a base station due to a change of a transmission power supplied to the base station.

In the above other aspect of the invention, the method of acquiring ad hoc route information may further comprise: a step of having a short-distance wireless communication interface that performs short-distance wireless communication; a step of estimating a positional relationship between the wireless communication device itself and a wireless communication device adjacently existed, based on the information obtained from the short-distance wireless communication interface; and a step of updating route information in the ad hoc network followed by activating the route searching if the positional relationship is changed.

The above method of acquiring ad hoc route information can quickly update route information in response to a topology change since the method searches a route by estimating a topology change in response to a change of a circumferential environment.

Here, the information obtained from the short-distance wireless communication interface may be the strength of an electric field of a signal received from a wireless communication device adjacently existed.

The above method of acquiring ad hoc route information can quickly update route information in response to a topology change since the method search a route by estimating the positional relationship based on the strength of the received electric field and estimating a topology change in response to the change of the positional relationship of the communication device adjacently existed, while any specific devices for identifying such position are not mounted in the wireless communication device.

In the above aspect of the invention, the information obtained from the short-distance wireless communication interface may be positioning information.

The above method of acquiring ad hoc route information can quickly update route information in response to a topology change since the method searches a route by managing the positional relationship and estimating a topology change in response to the change of the positional relationship of the communication device adjacently existed, while any specific devices for identifying such position are not mounted in the wireless communication device.

Advantage of the Invention

The communication device of the present invention searches a route with a normal power for data communication required as a real time property and searches discover a route with a saved power for data communication not required as a real time property under the situation when route information is not maintained at the time of requiring communication. Hence, the present invention can acquire a route that holds fairness on transmission powers and saving transmission powers toward data communication not required as a real time property.

BRIEF DESCRIPTION OF DRAWINGS

FIG. 3 is a table showing an example of route information entry performed by the wireless communication device in the first embodiment.

FIG. 5 is a table showing an example of a route searching entry performed by the wireless communication device in the first embodiment.

FIG. 6 is a table showing a message format of a route requested by the wireless communication device in the first embodiment.

FIG. 7 is a table showing a message format of a route responded by the wireless communication device in the first embodiment.

FIG. 9 is a table showing an example of a route searching entry performed by the wireless communication device in the first embodiment.

FIG. 15 is a table showing an example set by a unit for setting acquisition of information of a wide area wireless communication receiving environment in the wireless communication device of the second embodiment.

FIG. 17 is a table showing an example set by the unit for setting acquisition of information of a wide area wireless communication receiving environment in the other wireless communication device of the second embodiment.

FIG. 19 is a table showing an example of information of a nearby wireless communication device adjacent to the wireless communication device in the third embodiment.

FIG. 20 is a table showing other example of information of a nearby wireless communication device adjacent to the wireless communication device in the third embodiment.

EXPLANATION OF THE REFERENCE NUMERALS

Figure 1:
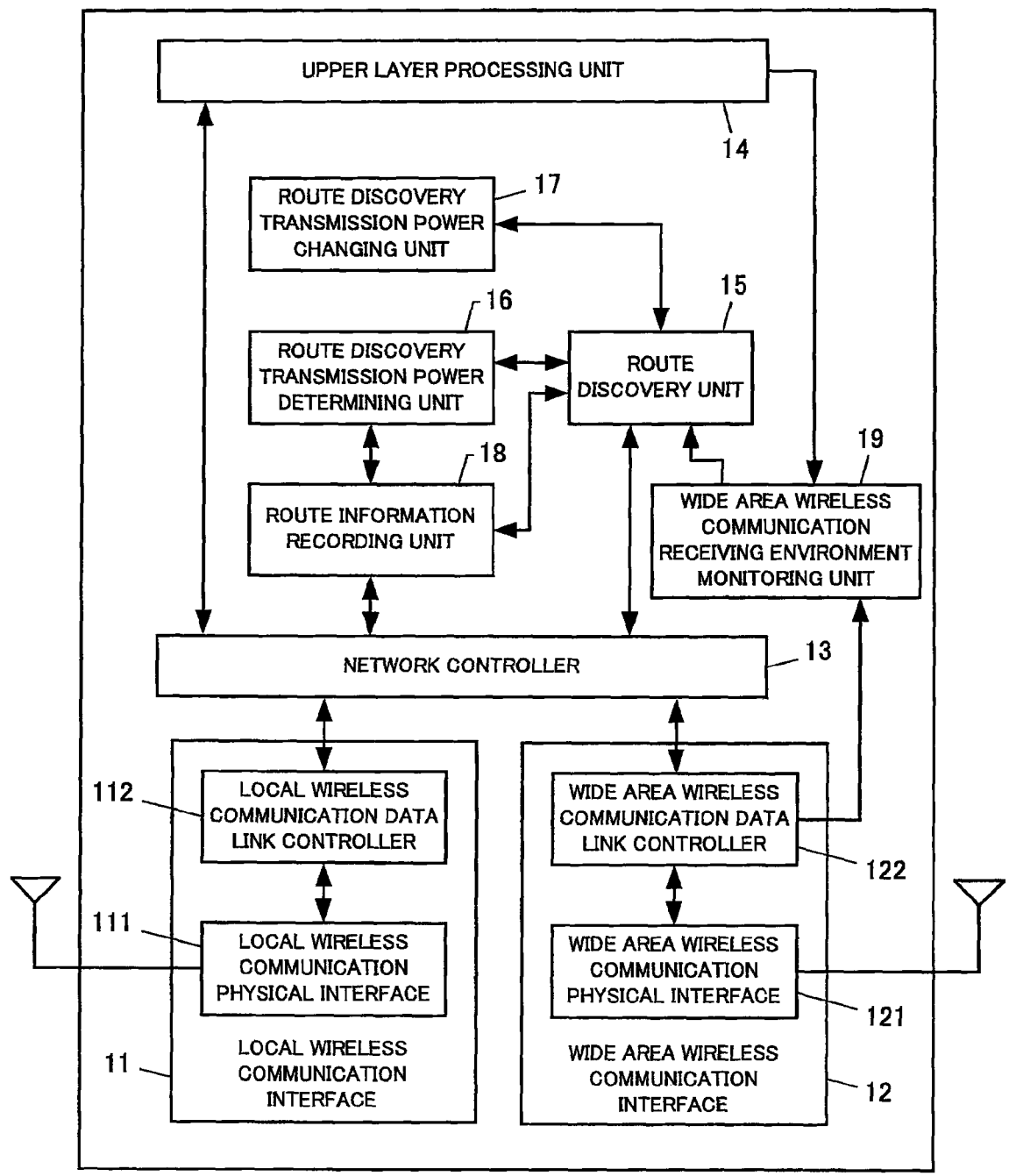
FIG. 1 is a block diagram of a wireless communication device regarding a first embodiment of the invention.

11: local wireless communication interface
111: local wireless communication physical interface
112: local wireless communication data link controller
12: wide area wireless communication interface
121: wide area wireless communication physical interface
122: wide area wireless communication data link controller
13: network controller
14: upper layer processing unit
15: route discovery unit
16: route discovery transmission power determining unit
17: route discovery transmission power changing unit
18: route information recording unit
19: wide area wireless communication receiving environment monitoring unit
21: wide area wireless communication receiving environment monitoring unit
211: unit for generating a signal of activating route searching
212: unit for setting acquisition of information of a wide area wireless communication receiving environment
213: unit for collecting wide area wireless communication receiving environment information
31: short range communication device interface
311: short range communication device physical interface
312: short range communication device data link controller
32: nearby wireless communication device monitoring unit

THE PREFERRED EMBODIMENTS OF THE INVENTION

Embodiments of the invention will now be described with reference to the accompanying drawings.

First Embodiment

FIG. 1 is a diagram showing a wireless communication device according to a first embodiment of the present invention.

According to FIG. 1, the wireless communication device 1 comprises a local wireless communication interface 11, a wide area wireless communication interface 12, a network controller 13, an upper layer processing unit 14, a route discovery unit 15, a route discovery transmission power determining unit 16, a route discovery transmission power changing unit 17, a route information recording unit 18, and a wide area wireless communication receiving environment monitoring unit 19.

The local wireless communication interface 11 is operable to perform wireless communication within a local area. The wide area wireless communication interface 12 is operable to perform wireless communication in a wide area. The network controller 13 is operable to control a communication by deciding a next destination for a packet, and transmitting the packet via the local wireless communication interface 11 or the wide area wireless communication interface 12 as well as processing the packet received via the local wireless communication interface 11 or the wide area wireless communication interface 12. The upper layer processing unit 14 is operable to process layers such as an application layer, a presentation layer, a session layer, and a transportation layer for displaying an image, receiving an input and controlling a communication. The route discovery unit 15 is operable to search discover a route by transmitting and receiving a route control message. The route discovery transmission power determining unit 16 is operable to make a decision of a minimum transmission power which is usable for transmitting a route request message when searching a communication route within an ad hoc network. The route discovery transmission power changing unit 17 is operable to change a minimum transmission power which is usable for transmitting a route request message when re-searching a route due to time-out during route searching. The route information recording unit 18 is operable to record information of a route to a destination wireless communication device every usable transmission power as a route information entry. The wide area wireless communication receiving environment monitoring unit 19 is operable to record information of an identifier of a base station connected via the wide area wireless communication interface 12 as wide area communication link information.

The local wireless communication interface 11 comprises a local wireless communication physical interface 111 including an antenna, a RF circuit, and a base band processing circuit and a local wireless communication data link controller 112.

The local wireless communication physical interface 111 modulates a signal received from the local wireless communication data link controller 112, convert it into a radio signal and transmits it from an antenna. Further, the local wireless communication physical interface 111 demodulates a radio signal received from an antenna and sends the demodulated signal to the local wireless communication data link controller 112. The local wireless communication physical interface 111 includes a setting register for setting a usable transmission power of which amplitude is set depending on values in the setting register. The usable transmission power is changed via the setting register.

The local wireless communication data link controller 112 frames a packet obtained from a network controller 13 with a predetermined format defined by a data link to be used and sends the framed packet to the local wireless communication physical interface 111. Further, the local wireless communication data link controller 112 sends a digital signal received from the local wireless communication physical interface 111 to the network controller 13 after removing a data link header and a tailer within the digital signal. Further it acquires a right of accessing a wireless medium, in accordance with an accessing method defined by a data link layer to be used.

Further, the local wireless communication data link controller 112 sets a value corresponding to a usable transmission power which is set by the setting register of the local wireless communication physical interface 111 after acquiring information regarding the usable transmission power (called as transmission power information hereafter) from the network controller 13 when transmitting route control messages such as a route request message and a route response message.

The local wireless communication interface 11 is regulated by communication methods such as IEEE (Institute of Electrical and Electronic Engineers) 802.11a, IEEE802.11b, IEEE802.11g, IEEE802.11n, IEEE802.11e, BLUETOOTH (trademark), UWB (Ultra Wide Band), and WiMAX (Worldwide Interoperability for Microwave Access) for example.

The wide area wireless communication interface 12 comprises a wide area wireless communication physical interface 121 including an antenna, a RF circuit, and a base band processing circuit and a wide area wireless communication data link controller 122.

The wide area wireless communication physical interface 121 modulates a signal received from the wide area wireless communication data link controller 122, converts it into a radio signal and transmits it from an antenna. Further, the wide area wireless communication data link controller 122 demodulates a radio signal received from an antenna and sends the demodulated signal to the wide area wireless communication data link controller 122. The wide area wireless communication physical interface 121 includes a setting register for setting a usable transmission power of which amplitude is set depending on values in the setting register. The usable transmission power is changed via the setting register.

The wide area wireless communication data link controller 122 frames a packet obtained from a network controller 13 with a predetermined format defined by a data link to be used and sends the framed packet to the wide area wireless communication physical interface 121. Further, the wide area wireless communication data link controller 122 sends a digital signal received from the wide area wireless communication physical interface 121 to the network controller 13 after removing a data link header and a tailer within the digital signal. Further it acquires a right of accessing a wireless medium, in accordance with an accessing method defined by a data link layer to be used.

The wide area wireless communication data link controller 122 also sends information of an identifier regarding a connected base station to the wide area wireless communication receiving environment monitoring unit 19.

The wide area wireless communication interface 12 is regulated by communication methods such as for example 3GPP (3rd Generation Partnership Project), a mobile communication system (IMT-2000 (International Mobile Telecommunication 2000) standard) standardized by 3GPP2 (3rd Generation Partnership Project 2), PDC (Personal Digital Cellular) system, GSM (Global System for Mobile Communications) system.

The upper layer processing unit 14 receives and sends data from and to the network controller 13, depending on necessity and sends a communication data property handled by the application layer to the network controller 13 when starting communication.

The network controller 13 performs network-layers processing such as internet protocol (IP) processing, address resolution protocol (ARP) processing and internet control message protocol (ICMP) processing against a message received from the upper layer processing unit 14. For example, in the IP processing, it adds an IP header and sends it to the local wireless communication data link controller 112 or the wide area wireless communication data link controller 122 by deciding a next destination for a final destination based on information stored in the route information recording unit 18. At this time, it makes a notice of a communication data property received from the upper layer processing unit 14 to the route discovery unit 15 in order to activate the route discovery unit 15 for getting the latest route if the next destination for the final destination in an ad hoc communication is not recorded as an efficient route information entry in the route information recording unit 18.

Further, the network controller 13 sends a packet received from the wide area wireless communication data link controller 122 to the upper layer processing unit 14 depending on necessity.

Further, the network controller 13 make a decision about whether it sends a packet received from the local wireless communication data link controller 112 to the upper layer processing unit 14 or the route discovery unit 15, or relays it to the other wireless communication device, and performs processing each of them.

Further, if the packet is intended for a sender or multiple addresses and includes a route control message such as a request message and a route response message, the network controller 13 extracts these messages and sends them to the route discovery unit 15.

If the packet is intended for a sender and includes a message regarding the upper layer, the network controller 13 sends the packet to the upper layer processing unit 14.

If the packet is not intended for a sender, the network controller 13 determines a next destination based on information from the route information recording unit 18, changes the packet header depending on necessity and sends the packet header to the local wireless communication data link controller 112.

Further, the network controller 13 adds a packet header to a route request message received from the route discovery unit 15 to be transmitted. The packet header includes an identifier meaning that itself is a sender and a destination is the same information. Then, the network controller 13 sends the added packet header to the local wireless communication data link controller 112 with designating a usable transmission power. Further, the network controller 13 adds a packet header to a route response message received from the route discovery unit 15 to be transmitted. The packet header includes identifiers and transmission power information. The identifiers indicate that a sender is the wireless communication device itself and a destination is a next hop wireless communication device in accordance with a sender wireless communication device within the route response message stored in the route information recording unit 18. Then, the network controller 13 sends the added packet header to the local wireless communication data link controller 112.

The route discovery transmission power determining unit 16 make a notice of a usable transmission power for transmitting a route request message when route searching to the route discovery unit 15 if data communication is performed under an ad hoc network. The usable transmission power is determined based on the property of transmission data received from the route discovery unit 15.

The route discovery transmission power changing unit 17 receives the route request message from the route discovery unit 15 as well as transmission power information when timeout is occurred during route searching. Then, it changes a usable transmission power and make a notice of it to the route discovery unit 15.

The route information recording unit 18 includes a memory medium such a hard disk, flash memory and the like, and holds fields with respect to {transmission power information, an identifier of a destination wireless communication device, an identifier of a next hopping wireless communication device, numbers of hopping, a lifetime and an effective flag} as a route information entry. The route information recording unit 18 receives an identifier of a destination wireless communication device, an identifier of a next hopping wireless communication device, transmission power information, and information of numbers of hopping, based on a route request message and a route response message processed by the route discovery unit 15. Then, it records them as well as a lifetime calculated from receiving time or a lifetime within a receiving message as a group of a route information entry and manages them as a table every transmission power information. The route information entry is managed by a timer. The entry gets to be invalid when it overruns a lifetime and further deleted if it overruns a predetermined time.

In case when a packet is sent to the local wireless communication data link controller 112 or the wide area wireless communication data link controller 122 from the network controller 13, a destination and the usable transmission power are determined based on the information stored in the route information recording unit 18.

The wide area wireless communication receiving environment monitoring unit 19 receives information regarding an identifier of a base station connected from the wide area wireless communication data link controller 122 and records it as wide area communication information. The interval of acquiring information regarding a identifier of a base station is 1 second, 10 seconds, or only when changing, for example. Such interval can be changed by a key input or menu selection after the interval is displayed on a wireless communication device by the upper layer processing unit 14.

When the wide area wireless communication link information is changed, the wide area wireless communication receiving environment monitoring unit 19 estimates the change of a circumferential environment due to moving and the like and, then instructs the route discovery unit 15 to search a route to a destination wireless communication device.

The route discovery unit 15 manages a route control message and, sends and receives a route control message.

When managing a route control message, the route discovery unit 15 manages {an identifier of a sender wireless communication device, an identifier of a destination wireless communication device, an identifier of searching a route, transmission power information, numbers of trials, and completed time} as one group of a route searching entry. The route discovery unit 15 extracts an appropriate message from route control information messages to be sent or received and records it as well as completed time calculated from processed time of these route control information messages. If time surpasses the completed time, the edited route searching entry is deleted.

Sending and receiving a route control message includes activating a route request message, re-sending a route request message, receiving a route request message and receiving a route response message.

In case of activating a route request message, when the route discovery unit 15 receives an instruction of starting search of a route on a ad hoc network from the network controller 13, it sends the information of a communication data property to the route discovery transmission power determining unit 16, and then requests usable transmission power information to the route discovery transmission power determining unit 16 when route searching. Further, the route discovery unit 15 forms a route request message including transmission power information based on transmission power information acquired from the route discovery transmission power determining unit 16. Then, it sends the message to the local wireless communication interface 11 via the network controller 13.

The route request message is also activated by the instruction from the wide area wireless communication receiving environment monitoring unit 19. When the route discovery unit 15 receives the instruction from the wide area wireless communication receiving environment monitoring unit 19, it searches a route information entry corresponding to a destination wireless communication device, in the current communication from the route information recording unit 18. Then it forms a route request message corresponding to a destination wireless communication device, in the current communication including transmission power information based on the transmission power information recorded in the route information entry and sends the message to the local wireless communication interface 11 via the network controller 13.

Here, re-sending a route request message is re-searching a route by a wireless communication device which started route searching in case when a route to a destination was not acquired. Namely, if a wireless communication device cannot receive a route response message until the completed time and further the numbers of trials are within permitted numbers, it adds 1 as a trial number and an identifier of route searching of the corresponding route searching entry. This route response message corresponds to the route request message if the device itself uniquely identified by the route searching entry is a sender. Further, the route discovery unit 15 makes a notice of route searching with transmission power information of the corresponding route searching entry to the route discovery transmission power changing unit 17. If the route discovery unit 15 receives power transmission information from the route discovery transmission power changing unit 17, it updates the power transmission information of the corresponding route searching entry and complete time, and forms route request information. Then, it sends the message to the local wireless communication interface 11 via the network controller 13.

When receiving the route request message, the route discovery unit 15 judges whether the message is a thing which was already received or not by referring to the route searching entry. If the message is a thing which was already received, the received route request message is discarded without doing anything. If the message is a firstly received thing, it forms an identifier of a sender wireless communication device, an identifier of a destination wireless communication device, an identifier of route searching, power transmission information and completed time calculated from the received time as a route searching entry. These identifiers and information are stored in the route request message.

Further, based on the power transmission information of the received route request information message, the route discovery unit 15 records a group of the identifier of a sender wireless communication device, the IP address of the sender, the numbers of hopping, the lifetime calculated from received time as a new route information entry into fields of the route information recording unit 18 and makes {effective flag} field effective. The IP address was stored in the IP header of the IP packet including the received route request message. These fields in the route information recording unit 18 are fields for {an identifier of the destination wireless communication device, an identifier of the next hopping wireless communication device, numbers of hopping and a lifetime.} But, if the same route information entry for a group of power transmission information, an identifier of a destination wireless communication device and an identifier of a next hopping wireless communication device is already existed, other field information is updated as the route information entry.

Then, the wireless communication device determines whether it is a destination regarding the route request message or not. If the device is a destination, the route discovery unit 15 forms a route response message including power transmission information stored within the received route request message and sends the route response message to the local wireless communication interface 11 via the network controller 13. If the device is not a destination, the route discovery unit 15 sends the received route request message to the local wireless communication interface 11 via the network controller 13 so as to send forward the received route request message with the usable power transmission stored in the route request message.

Figure 2:
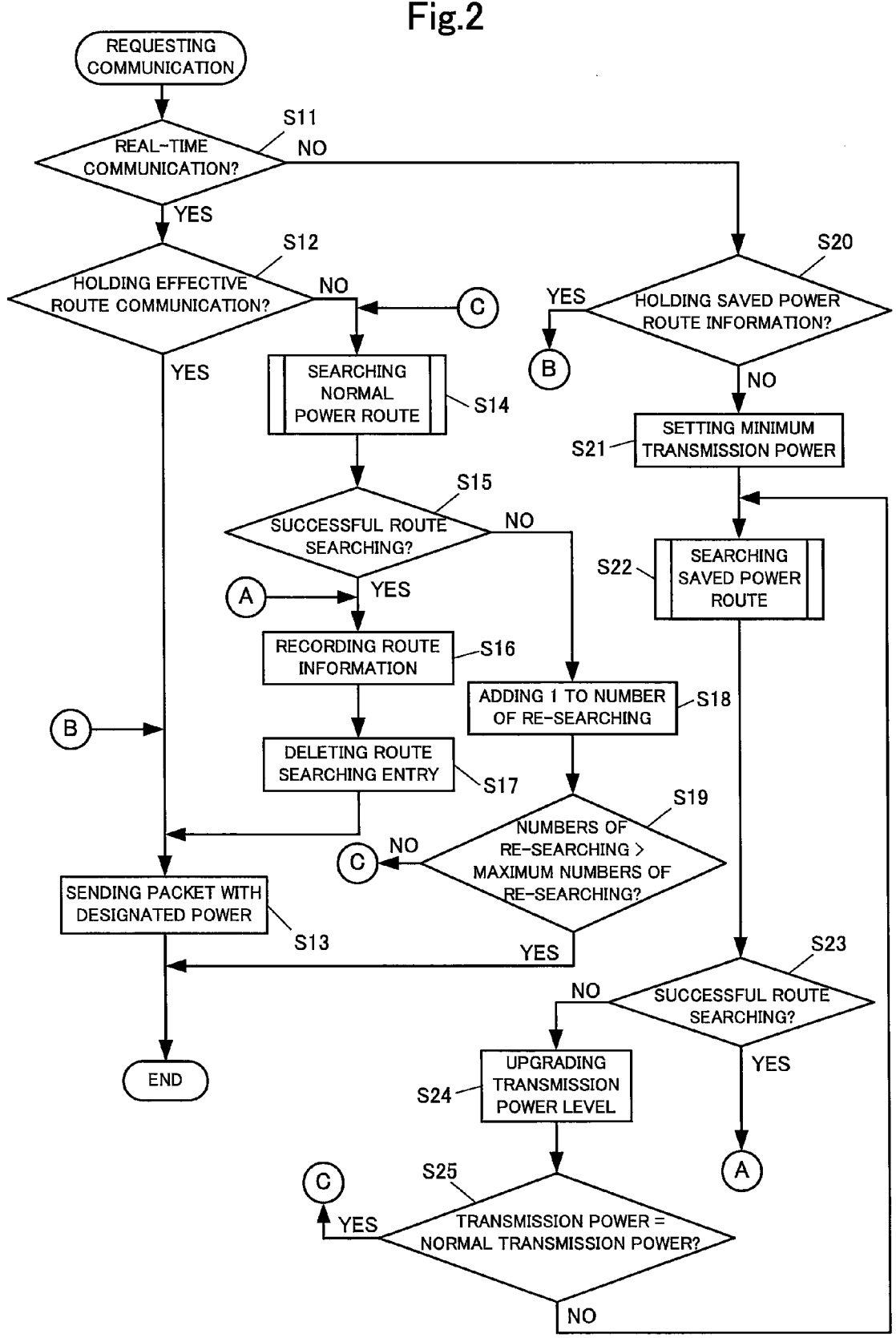
FIG. 2 is a flow chart explaining a process of the wireless communication device in the first embodiment when transmitting data.

FIG. 2 is a flow chart explaining a process of the wireless communication device in the first embodiment when requesting communication.

If communication applications such as a WEB browser, a mailer, and a TV telephone are activated by the upper layer processing unit 14 of a wireless communication device and communication request arises, the upper layer processing unit 14 sends the communication data property of the corresponding communication to the network controller 13 with a message to be sent.

The network controller 13 determines whether the received communication data property needs a real-time property or not (step S11). Data that needs a real time property is data that is requested as instantaneously sent to a communication partner, as continuously and routinely reaching a destination like a voice message during telephone call and an emergency message. On the other hand, data handled in transferring a file, sending and receiving a mail, browsing WEB sites are data that do not need a real time property.

The need of the real time property may be, for example, judged by recording a matrix map showing communication application and data property to be handled or referring to indices showing the communication property sent to a socket interface for communication.

If the communication data is judged as needing a real time property, the device judges whether it holds effective route communication to a destination communication wireless device (step S12). If a route information entry to a destination wireless communication device on the table of the normal transmission power in the route information recording unit 18 and the effective flag is effective, the device judges that it holds the effective route information.

If the device judges that it holds effective route information to a destination communication wireless device, it sends a packet with a designated power which is a normal power (step S13).

There is a case when the wireless communication device holds the route information entry and 30 mW of the normal transmission power shown in FIG. 3 for example. When the device generates real time communication to a wireless communication device of which an identifier is B, it sends a packet in which an identifier of a destination wireless communication device is B to a wireless communication device of which an identifier is X with 30 mW of a normal transmission power in case. The normal transmission power is 30 mW in the embodiment, but not limited to such value.

If the network controller 13 judges that the wireless communication device does not have effective rout information, it instructs the route discovery unit 15 to search a route accompanying with the communication data property (step S14).

The route discovery unit 15 acquires a transmission power from the route discovery transmission power determining unit 16 based on the received communication data property and then forms an identifier of a sender wireless communication device, an identifier of a destination wireless communication device, an identifier of route searching, power transmission information, numbers of trials and completed time as one group of a route searching entry shown in FIG. 5 (step S31).

FIG. 5 is a table showing an example of a route searching entry owned by the wireless communication device of which an identifier is A. It shows a route searching entry as a head. This route searching entry is newly formed by the wireless communication device of which the identifier is A if the wireless communication device of which the identifier is A, searches a normal power route to the wireless communication device of which an identifier is M.

As shown in FIG. 5, the route searching entry is newly formed by the following setting. Namely, the identifier of a sender wireless communication device is "A". The identifier of a destination wireless communication device is "M". The identifier of route searching is the value "28" by adding 1 to the identifier of route searching managed by the wireless communication device of which the identifier is A. The trial number is "0" since this is first time. The time of completing the wait for receiving a route response message is "3286".

Next, the route discovery unit 15 forms a route request message shown in FIG. 6, including the transmission power information and transmits it with a designated power (step S32).

In the above case, the route request message is sent to the network controller 13. This route request message includes bit arrays indicating 30 mW in the transmission power information field, the new route searching identifier 28 in the field of the identifier for a route request message, M in the field of a destination wireless communication device, A in the field of a sender wireless communication device. The network controller 13 stores the IP address of the wireless communication device of which the identifier is A into the IP header of the sender, stores the IP address meaning the same information into a destination IP address and makes them as a packet. The local wireless communication interface 11 sends this packet with the transmission power 30 mW.

Then, the network controller 13 judges whether a timer for waiting a route response message reaches expiration time or not (step S33). If the timer does not reach the time, it judges whether the device receives a route response message which is an object of the received transmission power information or not (step S34).

If a route response message as an object is received, route searching is judged as successful. But, if a route response message as an object is not received until the time when the timer reaches the expiration time, route searching is judged as unsuccessful.

In the above case, route searching is judged as successful if the route response message shown in FIG. 7 is received before time reaches "3286". The route response message includes bits arrays indicating M in the field of the identifier of a destination wireless communication device, A in the field of the identifier of a sender wireless communication device, 30 mW in the transmission power information field.

When returned to FIG. 2, the result of route searching is judged (step S15). If route searching is successful, a new route information entry is formed in a table of normal transmission powers in the route information recording unit 18. Then, the identifier of a sender wireless communication device, the identifier of a next hopping wireless communication device, the numbers of hopping, the lifetime and the effective flag which were obtained as the result of route searching, are recorded (step S16). If the past information entry is existed, information in each field is updated.

Then, the route searching entry formed in the route reaching (step S31 in FIG. 4) is deleted (step S17) and communication data is packed based on the route information recorded in step S16. The local wireless communication interface 11 sends the packet with a normal transmission power as a designated power (step S13).

If route searching is not successful, 1 is added to the numbers of re-searching (step S18) and whether the numbers of re-searching exceeds the maximum numbers of re-searching or not is judged (step S19).

If the numbers of re-searching does not exceed the maximum numbers of re-searching, a process returns to step S14 and route searching is performed again with a normal power.

If the numbers of re-searching exceeds the maximum numbers of re-searching, the communication trial is completed by judging that there is no communication partner since route information cannot be obtained if the numbers of re-searching reaches the maximum numbers of re-searching.

If the communication data property is not judged as needing a real time property in step S11, the network controller 13 judges whether it holds the information regarding an effective saved power route to a destination communication wireless device (step S20). If the route information entry to a destination communication wireless device exists and an effective flag is effective in the table except a normal transmission power in the route information recording unit 18, the network controller 13 judges that it holds the information regarding an effective saved power route, designates a corresponding usable transmission power and sends a packet with the designated power (step S13).

With respect to a wireless communication device holding a route information entry shown in FIG. 3, when non-real time communication to a wireless communication device of which an identifier is C is generated, a packet is sent to a wireless communication device of which an identifier is Y with the transmission power 1 mW. The packet includes the identifier of the destination wireless communication device as C.

If the network controller 13 judges that the original wireless communication device does not have effective rout information, it instructs the route discovery unit 15 to search a route accompanying with the communication data property.

Figure 8:
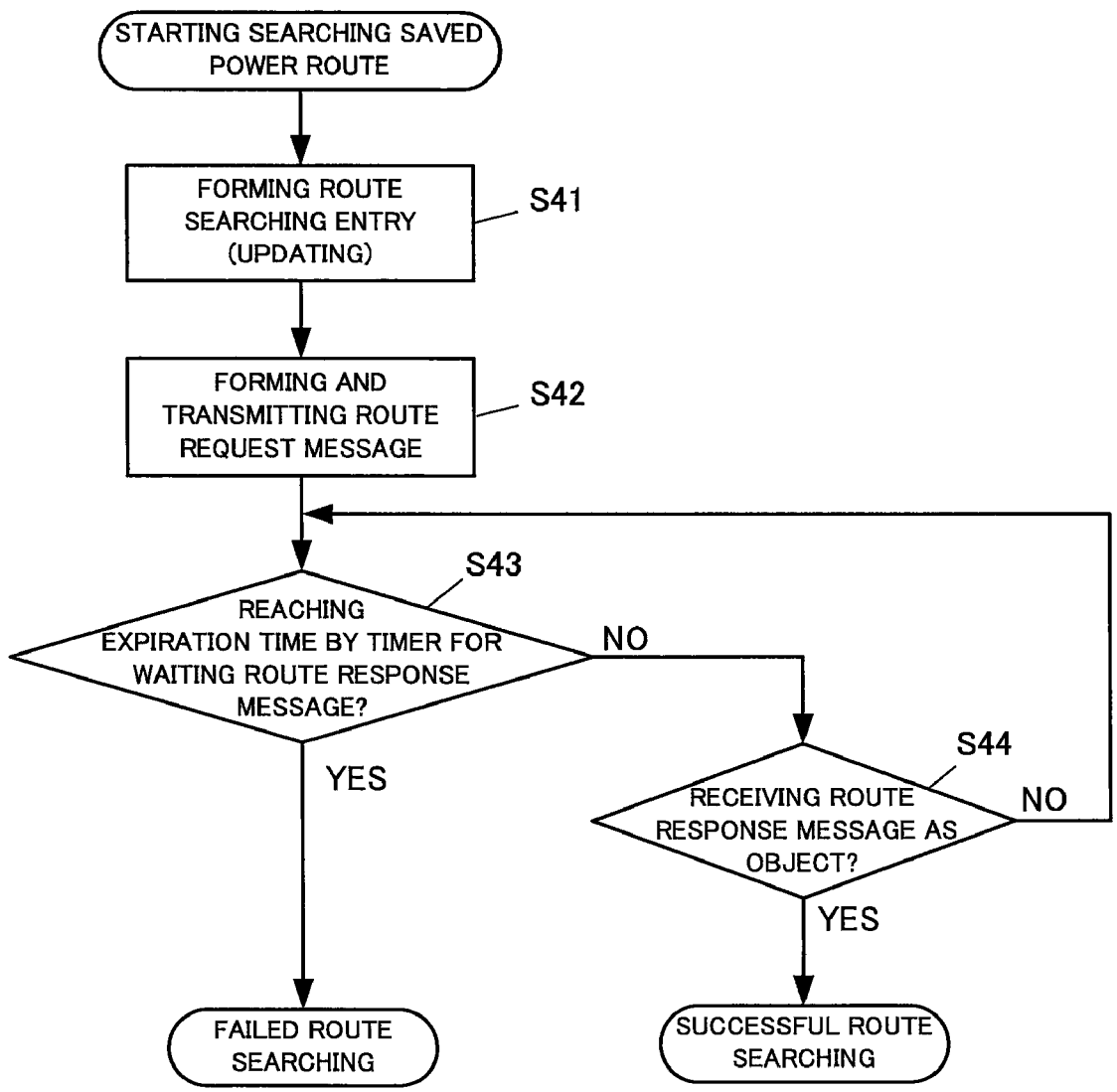
FIG. 8 is a flow chart explaining a process of searching a saved power route for the wireless communication device in the first embodiment.

The route discovery unit 15 acquires a usable transmission power from the route discovery transmission power determining unit 16 based on the received communication data property, sets the acquired usable transmission power to be the minimum transmission power (step S21) and searches a route as shown in FIG. 8 (step S22). The minimum transmission power is set to be 1 mW if transmission powers in the local wireless communication interface 11 are incrementally set such as 1 mW, 5 mW, 10 mW and 30 mW for example.

As shown in FIG. 8, the route discovery unit 15 forms an identifier of a sender wireless communication device, an identifier of a destination wireless communication device, an identifier of searching a route, transmission power information, numbers of trials, and completed time as one group of the route searching entry (step S41).

FIG. 9 is a table showing an example of a route searching entry owned by the wireless communication device of which an identifier is D. It shows a route searching entry as a head. This route searching entry is newly formed by the wireless communication device of which the identifier is D if the wireless communication device of which the identifier is D, searches a normal power route to the wireless communication device of which the identifier is Y.

As shown in FIG. 9, the route searching entry is newly formed by the following setting. Namely, the identifier of the sender wireless communication device is "D". The identifier of the destination wireless communication device is "Y". The identifier of route searching is the value "122" by adding 1 to the identifier of route searching managed by the wireless communication device of which the identifier is D. The trial number is "0" since this is first time. The time of completing the wait for receiving a route response message is "3795".

Next, the route discovery unit 15 forms a route request message shown in FIG. 6, including transmission power information and transmits it with a designated power (step S42).

In the above case, a route request message is sent to the network controller 13. This route request message includes bit arrays indicating 1 mW in the transmission power information field, the new route searching identifier 122 in the field of the identifier for a route request message, Y in the field of a destination wireless communication device, D in the field of a sender wireless communication device. The network controller 13 stores the IP address of the wireless communication device of which the identifier is D into the IP header of the sender, stores the IP address meaning the same information into a destination IP address and makes them as a packet. The local wireless communication interface 11 sends this packet with the transmission power 1 mW.

Then, the network controller 13 judges whether a timer for waiting a route response message reaches expiration time or not (step S43). If the timer does not reach the time, it judges whether the device receives a route response message which is an object of receiving transmission power information or not (step S44).

If a route response message as an object is received, route searching is judged as successful. But, if a route response message as an object is not received until the time when the timer reaches the expiration time, route searching is judged as unsuccessful.

In the above case, route searching is judged as successful if the route response message shown in FIG. 7 is received before time reaches "3795". The route response message includes bits arrays indicating Y in the field of a destination wireless communication device, D in the field of a sender wireless communication device, 1 mW in the transmission power information field.

When returned to FIG. 2, the result of route searching is judged (step S23). If route searching is successful, a new route information entry is formed in a table of the normal transmission power 1 mW in the route information recording unit 18. Then, the identifier of the sender wireless communication device, the identifier of the next hopping wireless communication device, numbers of hopping, the lifetime and the effective flag, which were obtained as the result of route searching are recorded (step S16). If the past information entry is existed, information in each field is updated.

Then, the route searching entry formed in the route searching (step S41 in FIG. 8) is deleted (step S17). Communication data is packed based on the route information recorded in step S16. A power set in the successful route searching is designated. The transmission power information about a signal sent from the local wireless communication interface 11 is added to the IP header. Then the packet is sent by the local wireless communication interface 11 (step S13). In the above case, the designated power is 1 mW.

If the route searching is not successful, the route discovery unit 15 sends a notice of re-searching to the route discovery transmission power changing unit 17 with the transmission power information, upgrades the transmission power level (step S24) and judges whether the transmission power reaches the normal transmission power or not (step S25).

If the transmission power does not reach a normal transmission power, processing is returned to step S22 and a route is searched with the set transmission power. If the transmission power reaches a normal transmission power, a normal power communication route is searched (step S14).

In the embodiment, usable transmission powers are incrementally set to be four levels such as 1 mW, 5 mW, 10 mW and 30 mW. If the saved power route searching at 1 mW is not successful, the transmission power is reset to be 5 mW as next and a saved power route is searched. This transmission power may be linearly varied instead of incrementally setting.

Figure 10:
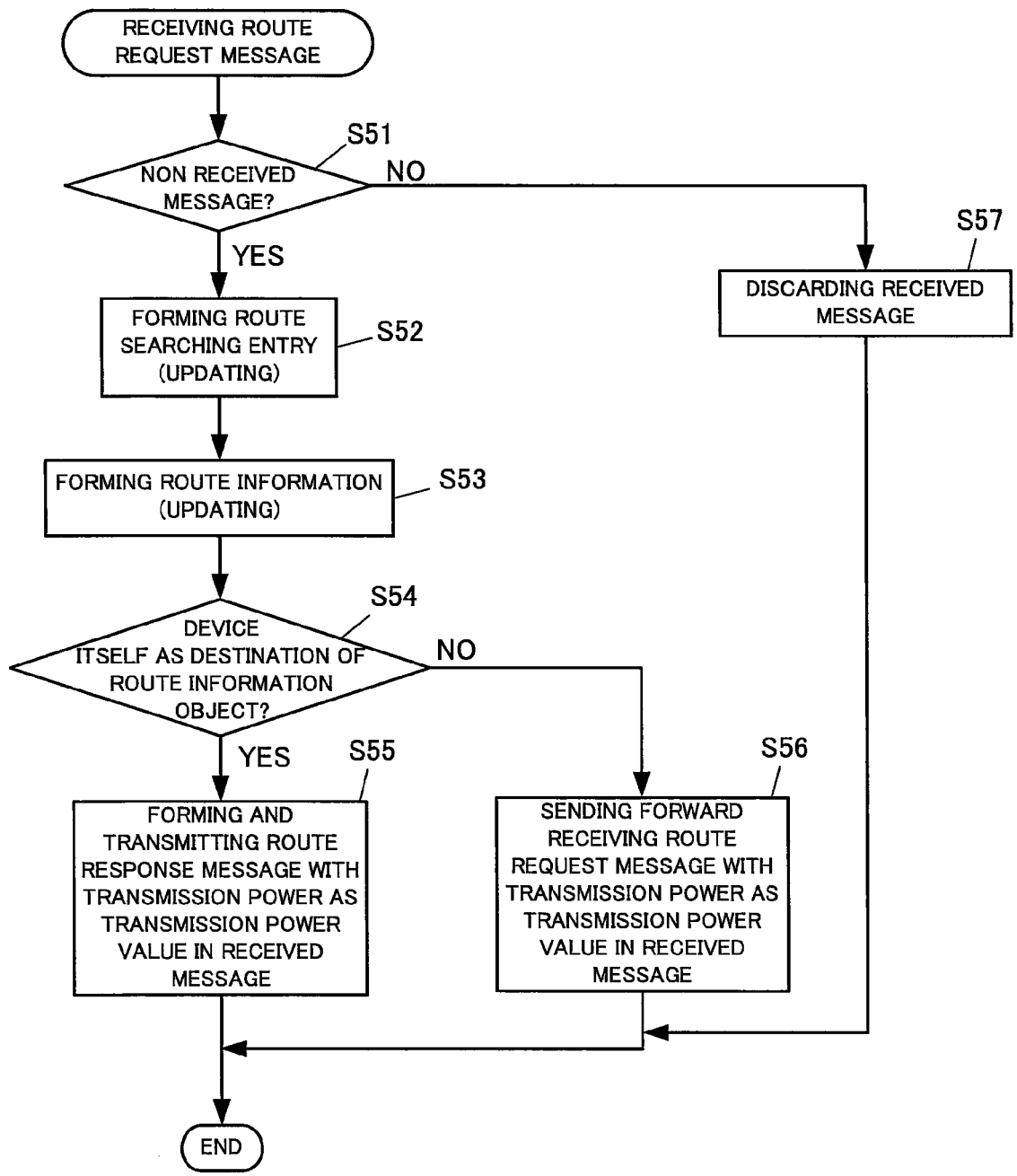
FIG. 10 is a flow chart explaining a process of receiving a message for requesting a route in the wireless communication device of the first embodiment.

FIG. 10 is a flow chart explaining a process of the wireless communication device in the first embodiment when receiving a route request message.

If the local wireless communication interface 11 receives the same information frame, it analyzes the frame and sends a packet to the network controller 13 with removing a header portion.

The network controller 13 analyzes the packet, extracts a route request message and sends it to the route discovery unit 15.

As shown in the flowchart of FIG. 10, the route discovery unit 15 refers to a route searching entry and judges whether the received route request message is a thing which was already received or not (step S51).

If the wireless communication device of which the identifier is A, holding the route searching entry shown in FIG. 5 receives a route request message of which the transmission power is 10 mW and the identifier of route searching is 8, this message is discarded since it was already received (step S57) and receiving process is completed. The route request message is a request from the wireless communication device of which the identifier is B to the wireless communication device of which the identifier is D.

If a corresponding route searching entry does not exist, a route request entry is formed based on various information within the route request message (step S52). If an entry, which accords to a combination of a sender wireless communication device with a destination wireless communication device, exists, but transmission power information and an identifier of route searching are different, this route searching entry is updated.

Next, the route discovery unit 15 forms (updates) route information (step S53). The route discovery unit 15 records each of the transmission power information, the identifier of a destination wireless communication device, and the numbers of hopping which are stored in the received route request message, into each of the fields such as {transmission power information, an identifier of a destination wireless communication device, and numbers of hopping}. The route discovery unit 15 further records the sender address of the IP header in the IP packet storing the received route request message into the field {of the identifier of a next hopping wireless communication device} and the lifetime calculated from time when the route request message is received into the field {of a lifetime}. Further, it sets an effective flag to be effective. If the route information entry as a combination of {the transmission power information, and the identifier of a destination wireless communication device} already exists, each of fields in the route information entry is only updated.

Further, the route discovery unit 15 judges whether the identifier of a destination wireless communication device in the received route request message accords to the identifier of the wireless communication device itself or not (step S54).

If these identifiers are accorded together, a route response message is formed. In this route response message, each of the transmission power information, the numbers of hopping, the identifier of a destination wireless communication device and the identifier of a sender wireless communication device, which are stored in the received route request message, is stored in each of fields edited as the format shown in FIG. 7. Here, the lifetime stored in the route response message includes time for holding a route information entry by each of wireless communication devices receiving the route response message.

The network controller 13 packs the formed route response message with adding an IP header based on the information stored in the route information recording unit 18. This packet is sent to the local wireless communication interface 11 and framed by it. Then, the packet is sent with a power of which a value is indicated in the power transmission information within the route response message (step S55).

If the identifier of a destination wireless communication device in the received route request message does not accord to the identifier of the wireless communication device itself, 1 is added to the hopping numbers field in the received route request message to be a new route request message, which is sent to the network controller 13.

The network controller 13 adds an IP header to the route request message from the route discovery unit 15 and packs it. This IP header includes an IP address where a sender is the identifier of the wireless communication device itself and a destination is the same information. This packet is sent to the local wireless communication interface 11 and framed by it. Then, it is sent with a power of which a value is indicated in the power transmission information within the route request message (step S56).

Figure 11:
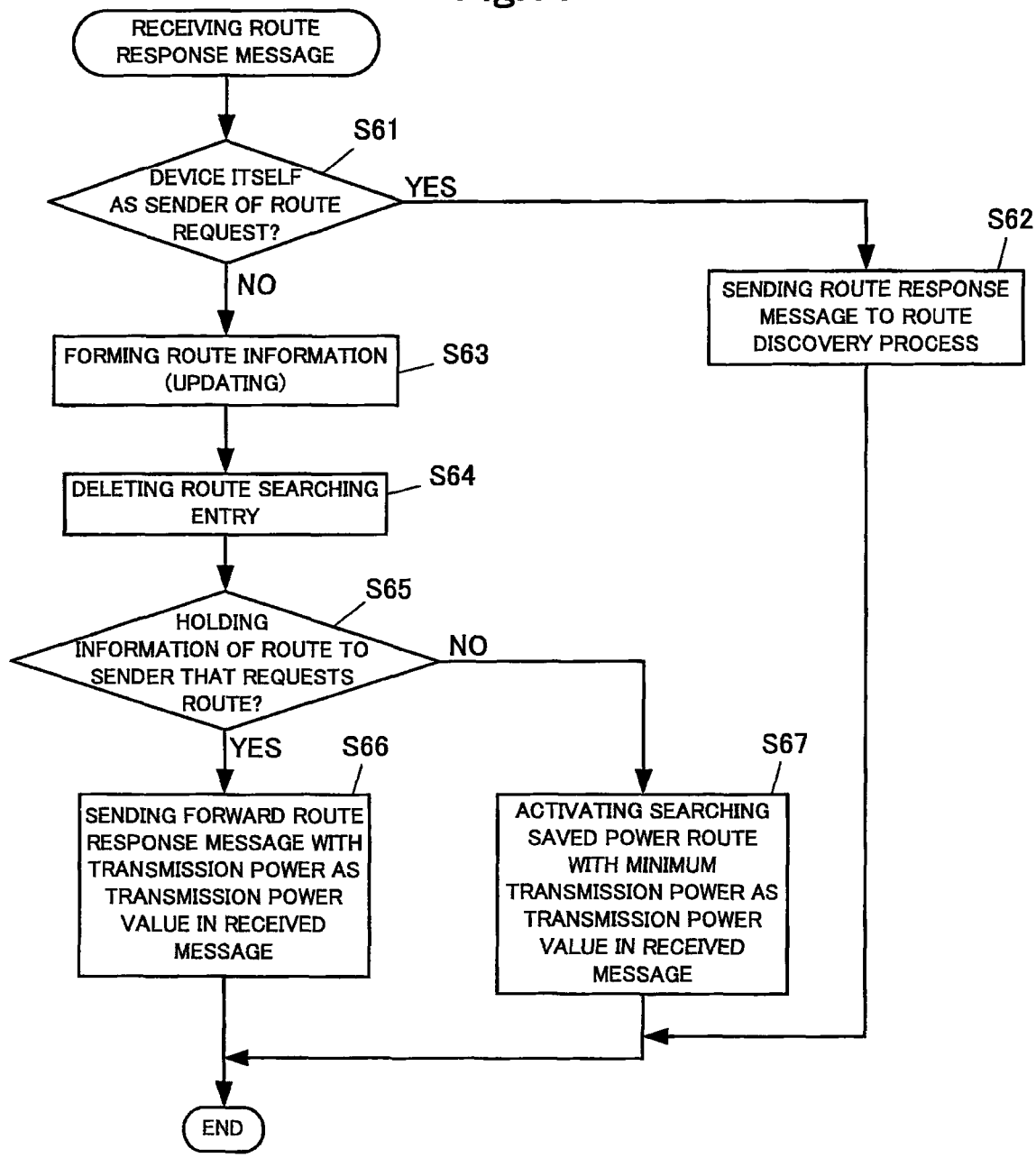
FIG. 11 is a flow chart explaining a process of receiving a message for responding a route in the wireless communication device of the first embodiment.

FIG. 11 is a flow chart explaining a process of the wireless communication device in the embodiment when receiving a route response message.

If the local wireless communication interface 11 receives a frame, it analyzes the frame and sends a packet to the network controller 13 with removing a header portion when the frame is a frame of the wireless communication device itself as a destination.

The network controller 13 analyzes the packet, extracts a route request message and sends it to the route discovery unit 15.

As shown in the flow chart of FIG. 11, the route discovery unit 15 judges whether the value in the field of the identifier of a sender wireless communication device in the route response message accords to the identifier of a wireless communication device itself or not (step S61). Namely, the route discovery unit 15 determines whether the wireless communication device itself is the sender of the route request message or not.

Figure 4:
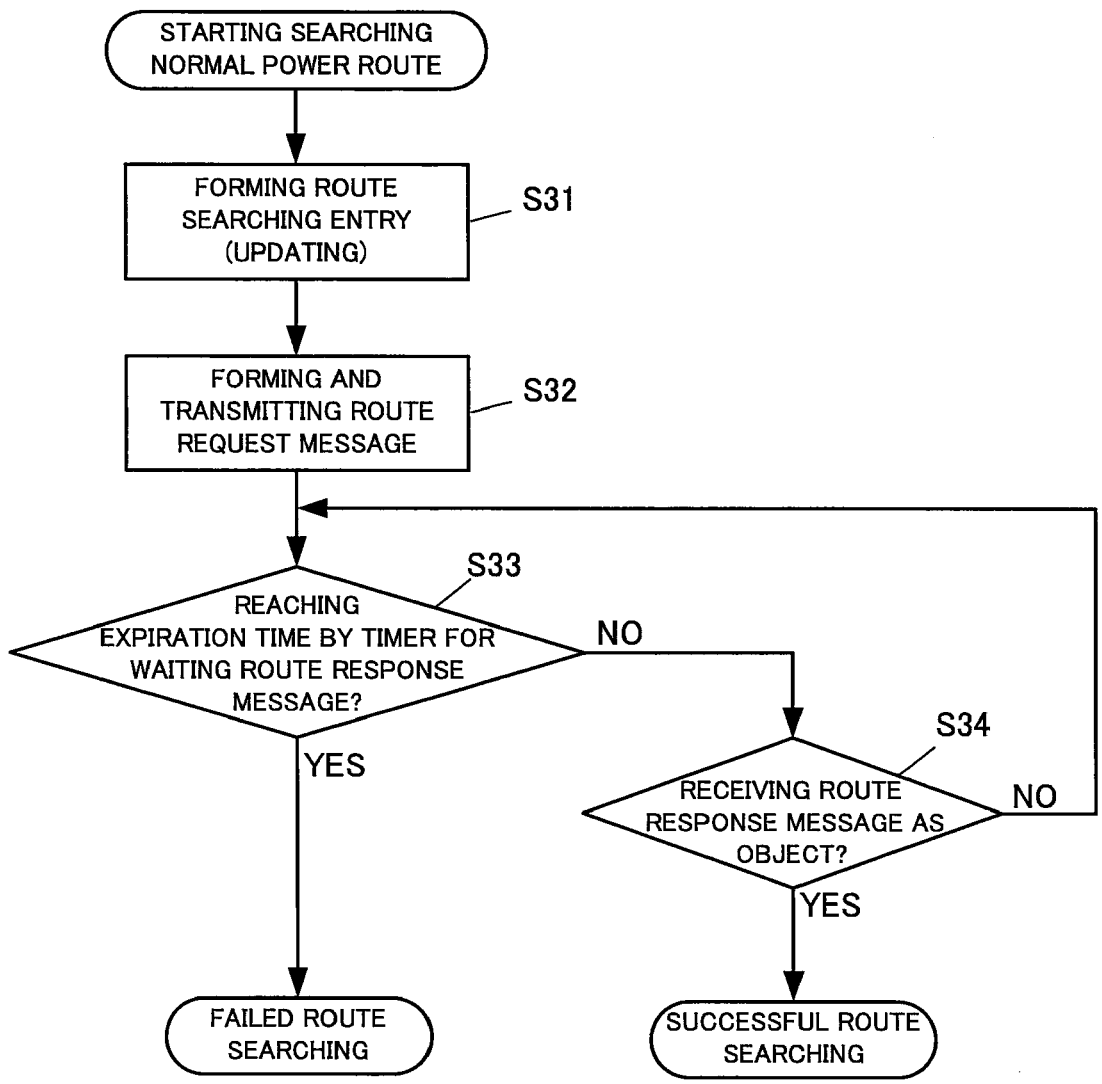
FIG. 4 is a flow chart explaining a process of searching a normal power route for the wireless communication device in the first embodiment.

If the wireless communication device itself is the sender, the route response message is sent to processing (step S34 or S44) for waiting the route response message corresponding to route searching shown in FIG. 4 and FIG. 8 (step S62).

If the wireless communication device itself is not the sender, the route discovery unit 15 records each value of the transmission power information, the identifier of a destination wireless communication device, the numbers of hopping and the lifetime, which are stored in the received route request message, into each of the fields such as {transmission power information, an identifier of a destination wireless communication device, the numbers of hopping and the lifetime.} In the field of {the identifier of a next hopping wireless communication device} of this entry, the received route response message is recorded as the sender address of the stored IP packet and {the effective flag} field is recorded as effective (step S63). If the route information entry as a combination of {the transmission power information, and the identifier of a destination wireless communication device} already exists, each of fields in the route information entry is only updated.

Next, the route discovery unit 15 searches a thing corresponding to the route response message received by the fields of {an identifier of a sender wireless communication device, an identifier of a destination wireless communication device and transmission power information.} It deletes the corresponding route information entry if it finds the message (step S64).

Further, the route discovery unit 15 judges whether a route information entry exists or not (step S65). In this route information entry, the power transmission information and the identifier of a sender wireless communication device stored in the received route response message are set to be {the power transmission information and the identifier of a destination wireless communication device.} Namely, it judges whether it holds the route information to the sender of the route request information or not.

If the route discovery unit 15 holds route information, it adds 1 to the field of hopping numbers of the received route response message to be a new route response message and sends the message to the network controller 13. The network controller 13 adds an IP header to the route response message received from the route discovery unit 15 and packs it. In this IP header, the identifier of the wireless communication device itself is the sender address and {the identifier of the next hopping wireless communication} in the route information entry is a destination address. In the identifier of the next hopping wireless communication, the combination of the power transmission with the identifier of the sender wireless communication device within the route response message accords to {the power transmission information, the identifier of a destination wireless communication device.} This packet is sent to the local wireless communication interface 11 and framed by it. Then, the packet is sent with a power of which the value indicated in the power transmission information within the route response message (step S66).

If it does not hold route information, the value of the transmission power information regarding the received route response message is set to be a minimum transmission power and searching of a saved power route to a wireless communication device is started (step S67). The wireless communication device is indicated as the identifier of the sender wireless communication device in the received route response message.

Based on the route information acquired by the above route searching processes and the power transmission information stored in the received IP packet, each of wireless communication devices relays the packet to others. Namely, if a wireless communication device itself is one for relaying a packet, it searches an effective entry in the route information recording unit 18 based on the power transmission information and the identifier of a destination wireless communication device stored in the IP packet and then sends forward the packet to a next hopping wireless communication device with a designated transmission power along with this entry.

Figure 12:
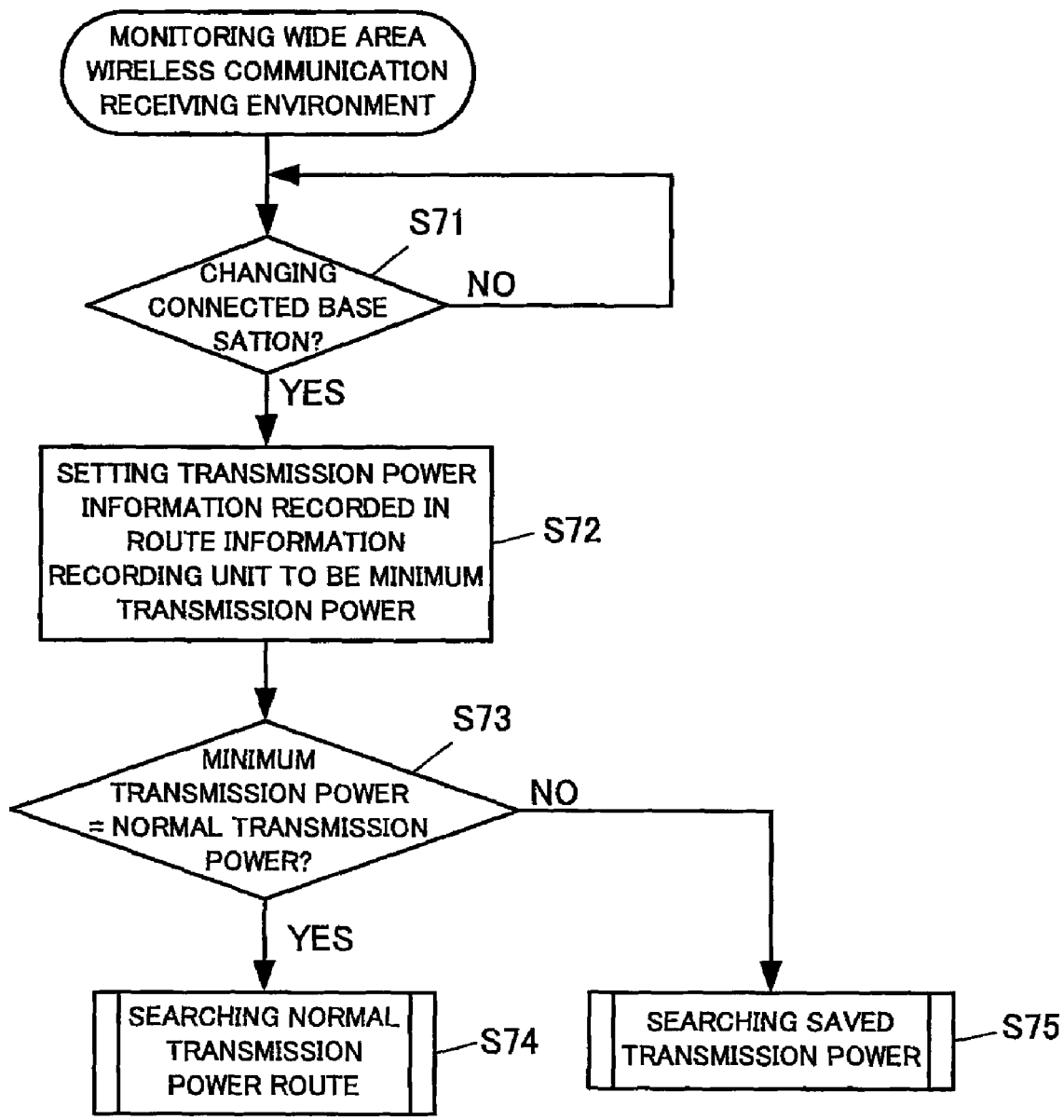
FIG. 12 is a flow chart explaining a process of updating route information in the wireless communication device in the first embodiment.

FIG. 12 is a flow chart explaining a process of changing route information regarding the wireless communication device in the embodiment.

If the wide area wireless communication receiving environment monitoring unit 19 receives the information of a connected base station from the wide area wireless communication interface 12, it judges whether the information of identifying a base station currently held by it is the same of the information of a connected base station from the wide area wireless communication interface 12 received from the wide area wireless communication interface 12 or not (step S71).

If the information is not the same, namely it judges that a connected base station is changed, the wide area wireless communication receiving environment monitoring unit 19 indicates the route discovery unit 15 to search a route to a destination wireless communication device.

When the route discovery unit 15 receives such instruction, it searches a route information entry regarding a destination of the data communication performed by the wireless communication itself from the route information recording unit 18 and sets the power transmission information recorded in the corresponding route information entry to be a minimum transmission power (step S72).

Then, the route discovery unit 15 judges whether the minimum transmission power is equal to a normal transmission power or not (step S73). If the minimum transmission power is equal to the normal transmission power, it starts searching a normal transmission power route (step S74).

If the minimum transmission power is not equal to the normal transmission power, it starts searching a saved power route while setting the minimum power transmission to be an initial value (step S75).

According to the embodiment, if a wireless communication device does not hold route information when requesting communication, the route discovery unit 15 searches a route with a normal power for data communication which needs a real time property, but it searches a route with a saved power for data communication which does not need a real time property. Hence, such method can acquire a route that maintains fairness of transmission powers and saved powers for data communication which does not need a real time property without regularly exchanging route information within an ad hoc network.

Further, the wide area wireless communication receiving environment monitoring unit 19 searches a route when a base station connected to the wide area wireless communication interface 12 is changed. This method can estimate topology change based on a circumferential change and searches a route for changing a route, quickly responding to the change of topology and updating a route on an ad hoc network.

Here, a transmission power is set via the route discovery unit 15, the network controller 13 and the local wireless communication data link controller 112. But, it may be set by the route discovery transmission power determining unit 16 or the route discovery unit 15 which accesses the setting register in the local wireless communication physical interface 111.

Further, the transmission power recorded in the route information entry is a minimum transmission power in step S72 for updating route information in FIG. 12. But such power may be a regulated minimum transmission power instead of the value recorded in the route information entry.

Further, each of function blocks such as the route discovery transmission power determining unit 16, the route discovery transmission power changing unit 17, the route discovery unit 15, the route information recording unit 18 and the wide area wireless communication receiving environment monitoring unit 19 can typically be realized as a large scale integration circuit (LSI). These may be separately formed as a single chip. Otherwise a part or all of them may be integrated as one chip.

Here, a system is integrated into LSI. But, the system may be called as an integrated circuit (IC) system LSI, super LSI or ultra LSI depending on integration levels.

But, integration is not limited to LSI, but it may be realized by a dedicated circuit or a general purpose processor. Otherwise, the integration may be realized by a field programmable gate array which is programmable after completing LSI or a reconfigurable processor which can reconstruct connection of internal circuit cells and setting of them.

Further, if a new technology of integration will appear by the development of a semiconductor technology or other different technology derived from it instead of LSI, the above functional blocks may be integrated by using it. A biologic technology may be applied to such integration.

Second Embodiment

Figure 13:
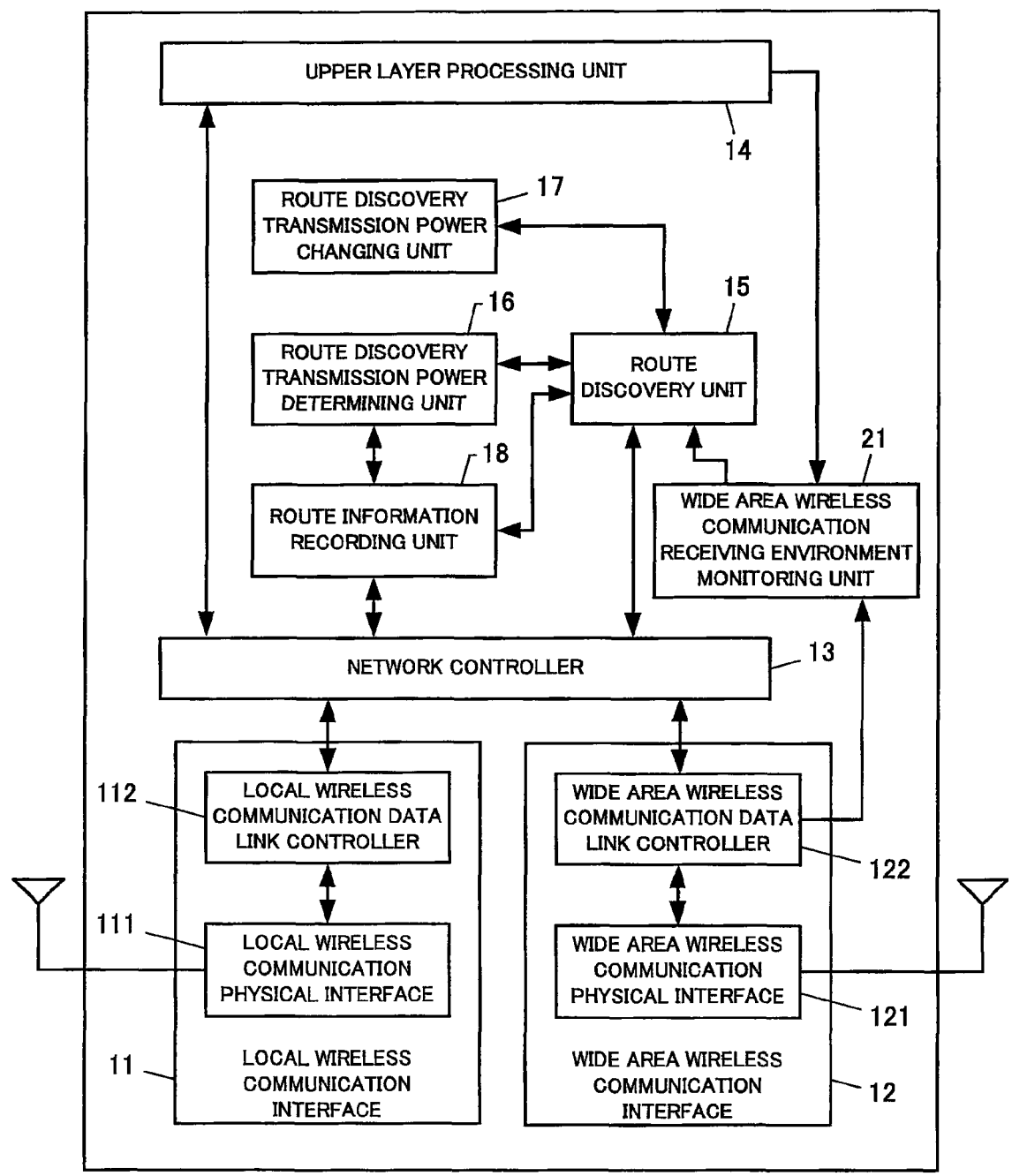
FIG. 13 is a block diagram of a wireless communication device regarding a second embodiment of the invention.

FIG. 13 is a diagram showing a wireless communication device according to a second embodiment of the invention. Here, in the second embodiment, the same reference numerals in the first embodiment are applied to the same constituents and only brief key points about them will be explained since they are the same constituents in the first embodiment.

The second embodiment features that a wide area wireless communication receiving environment monitoring unit 21 not only changes a base station maintained by the wide area wireless communication interface 12, but monitors other wide area wireless communication receiving environments and indicates the route discovery unit 15 to search discover a route.

Figure 14:
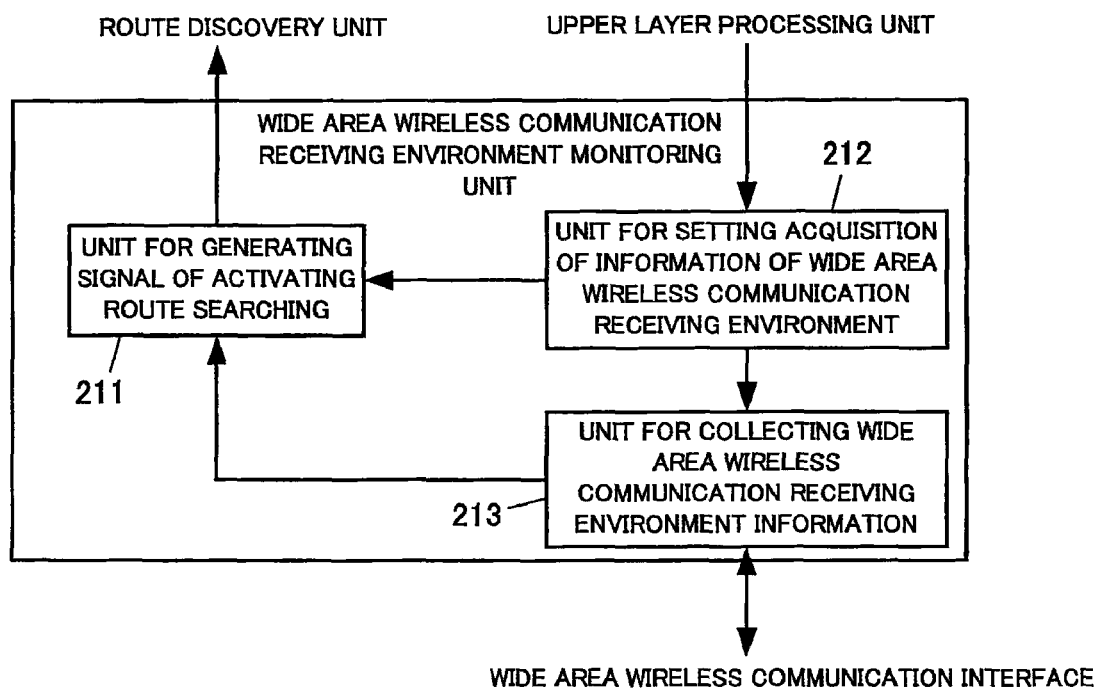
FIG. 14 is a block diagram of a wide area wireless communication receiving environment monitoring unit in the wireless communication device regarding a second embodiment of the invention.

FIG. 14 is a block diagram of the wide area wireless communication receiving environment monitoring unit 21 of the embodiment.

As shown in FIG. 14, the wide area wireless communication receiving environment monitoring unit 21 comprises a unit for generating a signal of activating route searching 211, a unit for setting acquisition of information of a wide area wireless communication receiving environment 212 and a unit for collecting wide area wireless communication receiving environment information 213. The unit for generating a signal of activating route searching 211 indicates the route discovery unit 15 to search a route based on collected information. The unit for setting acquisition of information of a wide area wireless communication receiving environment 212 sets information for broad and wireless communication link. The unit for collecting wide area wireless communication receiving environment information 213 collects information of broad and wireless communication links from the wide area wireless communication interface 12.

The unit for setting acquisition of information of a wide area wireless communication receiving environment 212 sets information of broad and wireless communication links monitored by the wide area wireless communication receiving environment monitoring unit 21. FIG. 15 is a diagram showing an example of the unit for setting acquisition of information of a wide area wireless communication receiving environment 212 in which the field of the information regarding a wide area wireless communication receiving environment and the field of a trigger condition are set.

According to FIG. 15, if an identifier of a connected base station is changed, or the difference of the received electric field strength exceeds 19 dBm, the unit for generating a signal of activating route searching 211 instructs the route discovery unit 15 to search a route.

The above information can be changed by an event from the upper layer processing unit 14 such as input via a pointing device to an image of a change of setting the information of acquisition of a wide area wireless communication receiving environment, which is displayed in a display, or a key input.

For example, the following changes can be available. "The trigger condition for an identifier of a base station is a case when such an identifier is changed more than twenty times per minute." "A trigger condition for an identifier of a base station is made to be invalid or an entry itself is deleted. Activation of the route discovery unit is not instructed by a change of an identifier of a base station." "The trigger condition for a receiving electric field is a case when the difference of the strength of the received electric field exceeds 5 dBm". "Otherwise, a used frequency, a frame error rate, a bit error rate may be newly added as the information of acquisition of a wide area wireless communication receiving environment, and each of conditions may be set for each of them.

The unit for collecting wide area wireless communication receiving environment information 213 acquires the information set in the field of the information of acquisition of a wide area wireless communication receiving environment in the unit for setting acquisition of information of a wide area wireless communication receiving environment 212 from the wide area wireless communication interface 12. The unit for collecting wide area wireless communication receiving environment information 213 acquires the information by requesting it to the wide area wireless communication interface 12 or regularly letting the wide area wireless communication interface 12 to send it to the unit 213. The acquired information is used for judging whether the wide area wireless communication receiving environment monitoring unit 213 instructs the unit for generating a signal of activating route searching 211 to search a route or not.

The unit for generating a signal of activating route searching 211 judges whether it acquires route information of an ad hoc network or not based on the information of a wide area wireless communication link received from the unit for collecting wide area wireless communication receiving environment information 213.

If the unit for generating a signal of activating route searching 211 detects that the environment of receiving a wide area wireless communication link changes and exceeds the permitted range recorded in the unit for setting acquisition of information of a wide area wireless communication receiving environment 212, it instructs the route discovery unit 15 to search a route.

Figure 16:
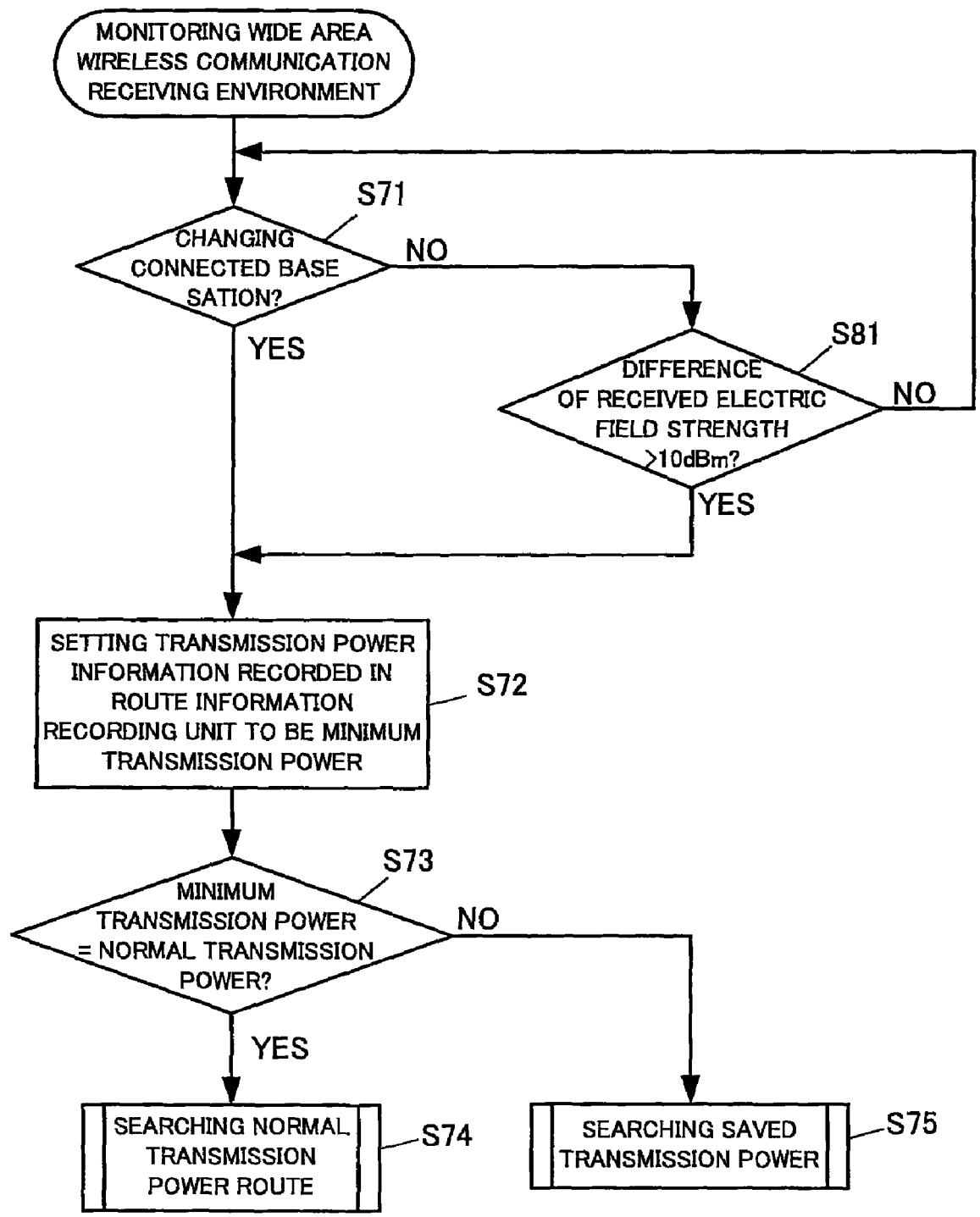
FIG. 16 is a flow chart explaining a process of updating route information for the wireless communication device in the second embodiment.

FIG. 16 is a flow chart explaining a process of updating route information for the wireless communication device in the embodiment. Here, the information set by the unit for setting acquisition of information of a wide area wireless communication receiving environment 212 is shown in the table of FIG. 15.

If the unit for generating a signal of activating route searching 211 receives the information of a wide area wireless communication link from the unit for collecting wide area wireless communication receiving environment information 213, it judges whether the information of base station identification currently hold by itself is the same of the information of a connected base station or not similarly to FIG. 12 (step S71). If the information is not the same, it instructs the route discovery unit 15 to search a route to a destination wireless communication device. If the route discovery unit 15 receives the above instruction, it searches a route information entry of a destination of data communication communicated with the wireless communication device itself, sets the transmission power information recorded in the corresponding route information entry to be a minimum transmission power (step S72), and judges whether the minimum transmission power is equal to a normal power or not (step S73). If the minimum transmission power is not equal to the normal power, it sets the minimum transmission power to be an initial value and starts searching a saved power route (step S75).

If the information of base station identification currently hold by itself is the same of the information of a connected base station, the unit for generating a signal of activating route searching 211 judges whether the difference between the update electric field received from the unit for collecting wide area wireless communication receiving environment information 213 and the immediately preceding received electric field exceeds 10 dBm or not (step S81).

If the difference of the strength of the received electric field exceeds 10 dBm, the unit for generating a signal of activating route searching 211 instructs the route discovery unit 15 to search a route to a destination wireless communication device. When the network controller 13 receives this instruction, it starts searching a route (from steps S72 to S75).

If the difference of the strength of the received electric field does not exceeds 10 dBm, a process is returned to step S71 and the unit for generating a signal of activating route searching 211 judges whether a base station is changed or not.

According to this embodiment, even when a connected base station is not changed under a wide area wireless communication environment, other wide area wireless communication receiving environment is monitored. Then, a topology change due to a circumferential environment change is estimated and a route is searched for updating a route. Hence, the embodiment can update a route on an ad hoc network in accordance with a topology change.

Further, the embodiment can search a route along a user's preference by user's change of trigger condition information for a route searching.

Further, each of function blocks such as the route discovery transmission power determining unit 16, the route discovery transmission power changing unit 17, the route discovery unit 15, the route information recording unit 18, the unit for generating a signal of activating route searching 211, the unit for setting acquisition of information of a wide area wireless communication receiving environment 212 and the unit for collecting wide area wireless communication receiving environment information 213 can typically be realized as a large scale integration circuit (LSI). These may be separately formed as a single chip. Otherwise a part or all of them may be integrated as one chip.

Here, a system is integrated into LSI. But, the system may be called as an integrated circuit (IC) system LSI, super LSI or ultra LSI depending on integration levels.

But, the integration is not limited to LSI, but it may be realized by a dedicated circuit or a general purpose processor. Otherwise, the integration may be realized by a field programmable gate array which is programmable after completing LSI or a reconfigurable processor which can reconstruct connection of internal circuit cells and setting of them.

Further, if a new technology of integration will appear by the development of a semiconductor technology or other different technology derived from it instead of LSI, the above functional blocks may be integrated by using it. A biologic technology may be applied to such integration.

As other application of the present embodiment, the information of a transmission power control for solving distance issues is used as the information of acquisition of a wide area wireless communication receiving environment in a base station within a mobile communication network utilizing a code division multiple access (CDMA) method. FIG. 17 is a table of information set by the wide area wireless communication receiving environment monitoring unit 212.

The above transmission power control is to control a transmission signal power so that a transmission signal from many wireless communication devices managed by a base station can be uniformly received with the same level by the base station.

As shown in FIG. 17, the unit for collecting wide area wireless communication receiving environment information 213 is set to acquire the power information about a signal transmitted from the wireless communication device itself via the wide area wireless communication interface 12 as the result of transmission power control. As the trigger condition for activating the route discovery unit 15, a power of a signal transmitted from the wireless communication device itself via the wide area wireless communication interface 12 is changed by more than 3 dB as the result of transmission power control.

In a process of updating route information, the unit for generating a signal of activating route searching 211 judges whether the difference between the update transmission power received from the unit for collecting wide area wireless communication receiving environment information 213 and the immediately preceding transmission power is more than 3 dB or not. If the difference between the update transmission power and the immediately preceding transmission power is more than 3 dB, the unit for generating a signal of activating route searching 211 instructs the route discovery unit 15 to search a route to a destination wireless communication device. If the route discovery unit 15 receives the above instruction, it searches a route information entry of a destination of data communication communicated with it, sets the transmission power information recorded in the corresponding route information entry to be a minimum transmission power (step S72), judges whether the minimum transmission power is equal to a normal power or not (step S73). If the minimum transmission power is not equal to the normal power, it sets the minimum transmission power to be an initial value and starts searching a saved power route (step S75).

If a change of a transmission power is not more than 3 dB, the route discovery unit 15 acquires information of a new transmission power and judges whether the change of power transmission is not more than 3 dB or not and repeat this process.

According to this embodiment, the wireless communication device of the embodiment can recognize a change of a communication environment between the wireless communication device itself and a base station under a wide area wireless communication environment, estimate a topology change search a route for updating a route. Hence, the device can update a route on an ad hoc network by quickly responding to the topology change.

Third Embodiment

Figure 18:
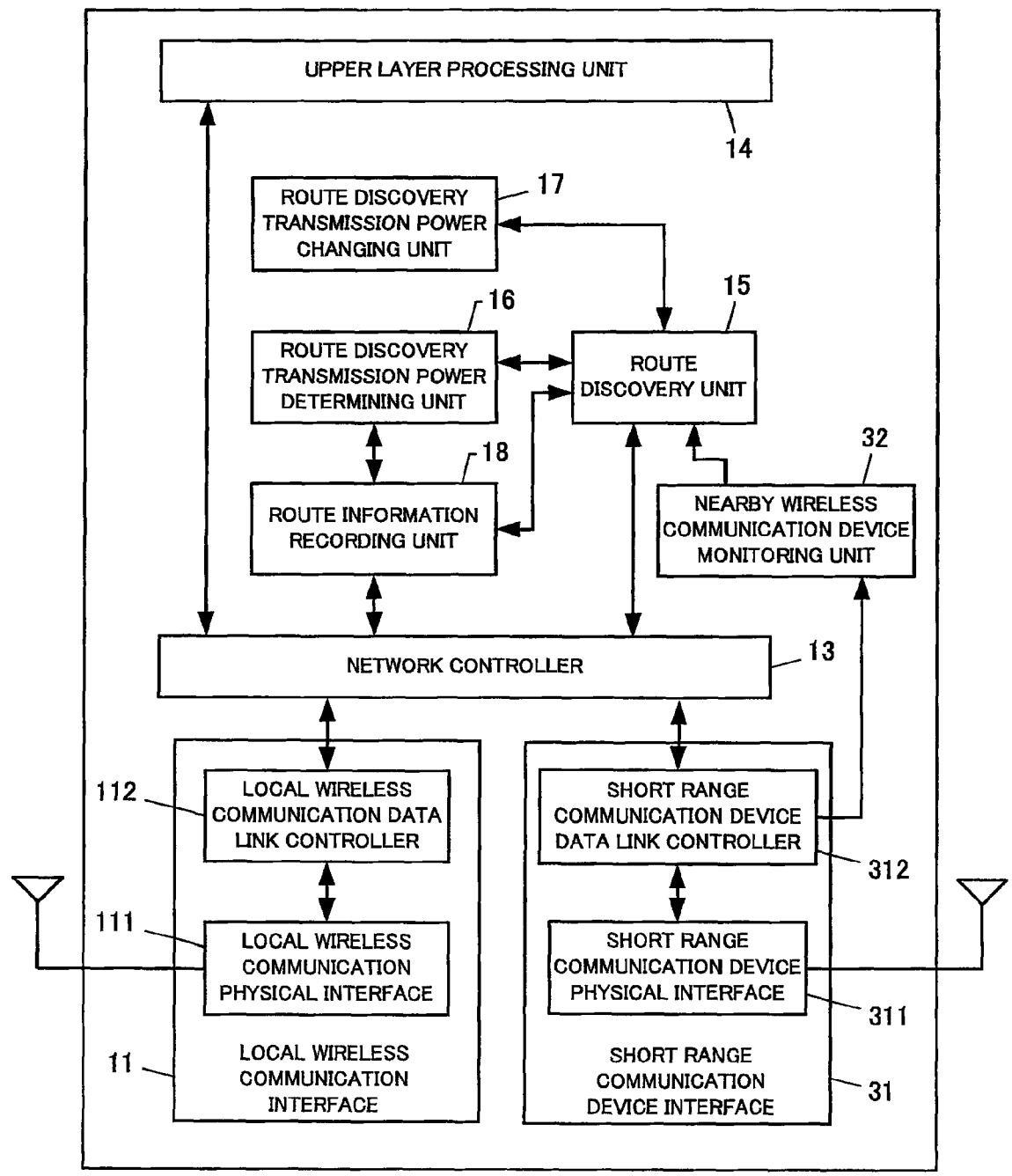
FIG. 18 is a block diagram of a wireless communication device regarding a third embodiment of the invention.

FIG. 18 is a diagram showing a wireless communication device according to a third embodiment of the invention. Here, in the third embodiment, the same reference numerals in the first embodiment are applied to the same constituents and only brief key points about them will be explained since they are the same constituents in the first embodiment.

According to the present embodiment, the wireless communication device comprises a short range communication device interface 31 and a nearby wireless communication device monitoring unit 32. The short range communication device interface 31 performs short range wireless communication. The nearby wireless communication device monitoring unit 32 estimates positional relationships among nearby wireless communication devices based on the electric field of a adjacent notice message received by the short range communication device interface 31 and instructs the route unit 15 to search (discover) a route if positional relationships among nearby wireless communication devices are changed. Further, the device estimates a change of topology based on positional relationships among nearby wireless communication devices and searches a route for updating a route.

The short range communication device interface 31 comprises a short range communication device physical interface 311 and a short range communication device data link controller 312.

The short range communication device physical interface 311 modulates a signal received from the short range communication device data link controller 312, convert it into a radio signal and transmits it from an antenna. Further, the short range communication device physical interface 311 demodulates a radio signal received from an antenna and sends the demodulated signal to the short range communication device data link controller 312.

The short range communication device data link controller 312 frames a packet obtained from the network controller 13 with a predetermined format defined by a data link layer to be used and sends the framed packet to the short range communication device physical interface 311. The short range communication device data link controller 312 sends a digital signal received from the short range communication device physical interface 311 to the network controller 13 after removing a data link header and a tailer within the digital signal. Further it acquires a right of accessing a wireless medium, in accordance with an accessing method regulated by a data link layer to be used.

Further, the short range communication device interface 31 sends the received information of a power in nearby notice message received from the nearby wireless communication devices to the nearby wireless communication device monitoring unit 32.

The short range communication device interface 31 is regulated by a communication method such as Bluetooth (trade mark) and UWB. Otherwise, it may be regulated by a non ad hoc communication method such as IEEE802.11a, IEEE802.11b, IEEE802.11n, and IEEE802.11e.

The nearby wireless communication device monitoring unit 32 manages an identifier of a wireless communication device which performs direct communication via the short range communication device interface 31. The nearby wireless communication device monitoring unit 32 records an identifier of a sender wireless communication device in the nearby notice message received via the short range communication device interface 31 and the received electric field strength of the nearby notice message into the management table of the information regarding the nearby wireless communication devices.

The nearby wireless communication device monitoring unit 32 estimates positional relationships of the nearby wireless communication devices based on the information recorded in the management table of the information regarding the nearby wireless communication devices.

The nearby wireless communication device monitoring unit 32 instructs the route discovery unit 15 to search a route if positional relationships of the nearby wireless communication devices are changed.

FIG. 19 is a table showing an example of the management table of the information regarding the nearby wireless communication devices. The wireless communication device recognizes existence of wireless communication devices which identifiers are A and B nearby. The strength of the received electric fields of the nearby notice messages are 10 dB and 12 dB.

According to the management table of the information regarding the nearby wireless communication devices shown in FIG. 19, the positional relationships among the wireless communication device itself and wireless communication devices of which identifiers are A and B are estimated as the following. The wireless communication device of which the identifier is B is the most nearest to the wireless communication device itself and the wireless communication device of which the identifier is A is secondarily near to the wireless communication device itself.

FIG. 20 shows an example of the management table of the information regarding the nearby wireless communication devices at other time. A wireless communication device recognizes existence of wireless communication devices which identifiers are A and B nearly existed. The strength of the received electric fields of the nearby notice messages are 15 dB and 8 dB.

Hence, the positional relationships among the wireless communication device itself and wireless communication devices of which identifiers are A and B are estimated as the following. The wireless communication device of which the identifier is A is the most nearest to the wireless communication device itself and the wireless communication device of which the identifier is B is secondarily near to the wireless communication device itself. Then the nearby wireless communication device monitoring unit 32 instructs the route discovery unit 15 to search a route.

Figure 21:
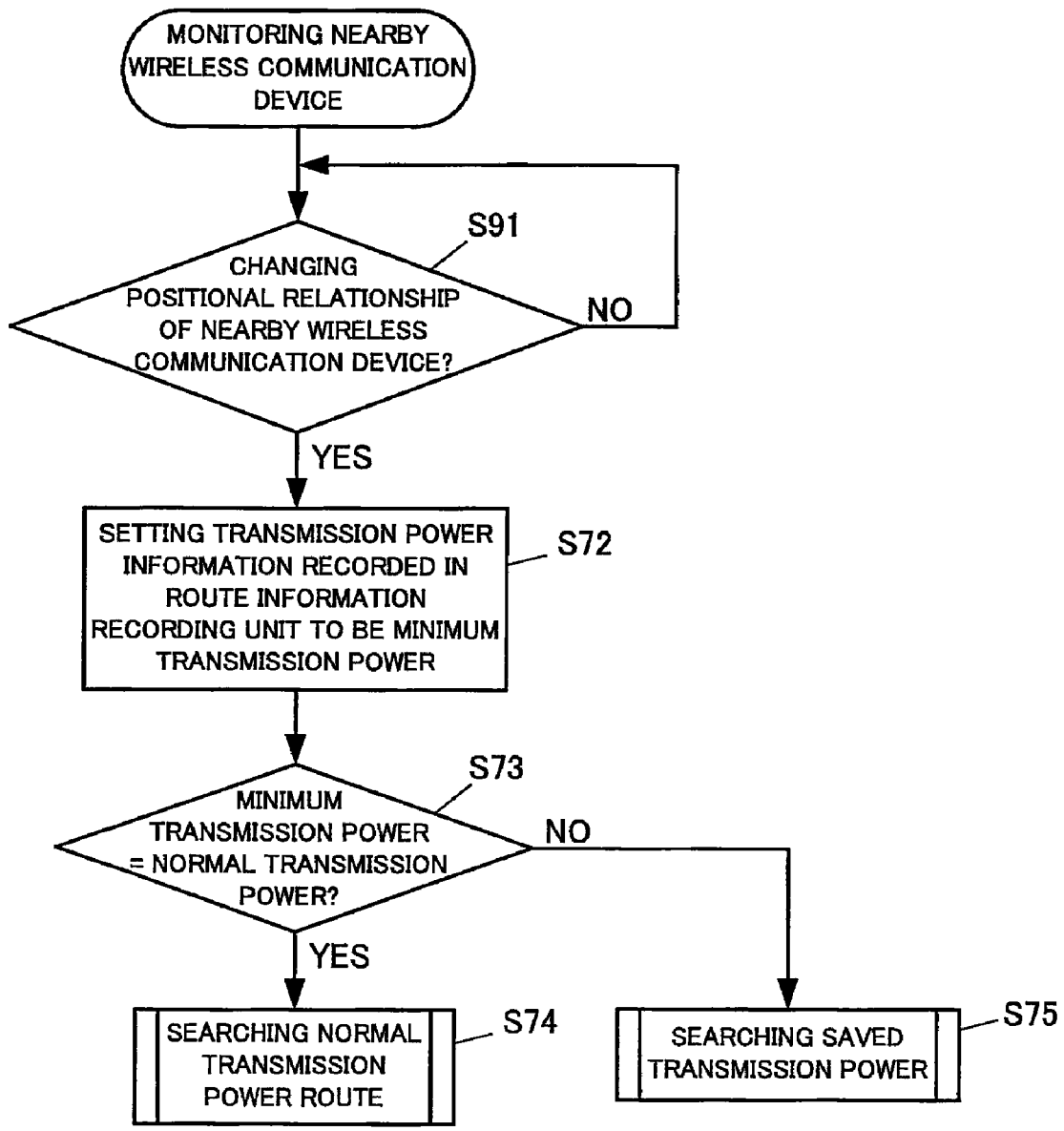
FIG. 21 is a flow chart explaining a process of updating route information for the wireless communication device in the third embodiment.

FIG. 21 is a flow chart of updating route information of the embodiment. The nearby wireless communication device monitoring unit 32 judges whether the positional relationships among nearby wireless commutation devices currently recognized by it are changed or not (step S91).

If the positional relationships are changed, the nearby wireless communication device monitoring unit 32 instructs the route discovery unit 15 to search a route to a destination wireless communication device. If the route discovery unit 15 receives the above instruction, it searches a route information entry of a destination of data communication communicated with itself similarly to FIG. 12, sets the transmission power information recorded in the corresponding route information entry to be a minimum transmission power (step S72), and judges whether the minimum transmission power is equal to a normal power or not (step S73). If the minimum transmission power is not equal to the normal power, it sets the minimum transmission power to be an initial value and starts searching a saved power route (step S75).

If the positional relationships are not changed, a process is returned to step S91 and the nearby wireless communication device monitoring unit 32 judges whether the positional relationships are changed or not.

According to this embodiment, the positional relationships among nearby wireless commutation devices nearly existed to the wireless commutation devise itself are estimated. If the positional relationships are changed, a topology change due to such change is estimated and a route is searched for updating a route. Hence, the embodiment can update a route on an ad hoc network by quickly responding to a topology change.

Further, each of function blocks such as the route discovery transmission power determining unit 16, the route discovery transmission power changing unit 17, the route discovery unit 15, the route information recording unit 18 and the nearby wireless communication device monitoring unit 32 can typically be realized as a large scale integration circuit (LSI). These may be separately formed as a single chip. Otherwise a part or all of them may be integrated as one chip.

Here, a system is integrated into LSI. But, the system may be called as an integrated circuit (IC) system LSI, super LSI or ultra LSI depending on integration levels.

But, integration is not limited to LSI, but it may be realized by a dedicated circuit or a general purpose processor. Otherwise, the integration may be realized by a field programmable gate array which is programmable after completing LSI or a reconfigurable processor which can reconstruct connection of internal circuit cells and setting of them.

Further, if a new technology of integration will appear by the development of a semiconductor technology or other different technology derived from it instead of LSI, the above functional blocks may be integrated by using it. A biological technology may be applied to such integration.

Further, in the embodiment, the positional relationship to the wireless communication device itself is estimated by the strength of the received electric field of the nearby notice message. But, a positioning interface such as UWB may be used as the short range communication device interface 31. Otherwise, a global positioning system (GPS) device may be used instead of the short range communication device interface 31. These substitutions can also obtain the same advantage by positioning the distance to the wireless communication device itself, recording such distance information into a management table of the information for nearby wireless communication devices.

INDUSTRIAL APPLICABILITY

As described above, the wireless communication device regarding the present invention has an advantage in that it acquires an appropriate route maintaining fairness of transmission powers and saved powers for data communication that does not need a real time property without regularly exchanging route information within an ad hoc network. Hence, the device can efficiently be used in a field of an ad hoc network or autonomous distribution communication network. Further, the invention can be applied to mobile type base stations having an advantage in that a basic network is easily constructed.

The invention claimed is:

1. A wireless communication device including a local wireless communication interface operable to establish an ad hoc network in at least one local area, and to perform communication with a destination device through the ad hoc network, comprising:
   a route discovery unit operable to discover a communication route to the destination device in the ad hoc network;
   a wide area wireless communication interface operable to perform wide area wireless communication through a wide area wireless communication network; and
   a wide area wireless communication receiving environment monitoring unit operable to monitor receiving environment of the wide area wireless communication interface, wherein
   the wide area wireless communication receiving environment monitoring unit activates the route discovery unit for getting the latest communication route in response to a change of receiving environment of the wide area wireless communication interface;
   a route discovery transmission power determining unit operable to determine a transmission power to be used for transmitting a route request message which is used for getting the communication route to the destination device; and
   a route discovery transmission power changing unit operable to incrementally increase the transmission power to be used for transmitting the route request message when the route searching unit fails to find the communication route to the destination device with the transmission power determined by the route discovery transmission power determining unit, wherein the route discovery transmission power determining unit determines a normal transmission power when the wireless communication device is requested to immediately send communication data to the destination device, and determines a transmission power lower than the normal transmission power when the wireless communication device is not requested to immediately send communication data to the destination device.

2. A wireless communication device including a local wireless communication interface operable to establish an ad hoc network in at least one local area, and to perform communication with a destination device through the ad hoc network, comprising:
- a route discovery unit operable to search a communication route to the destination device in the ad hoc network;
- a short distance wireless communication interface operable to perform short distance wireless communication through a short distance wireless communication network different from that of the local wireless communication interface;
- a short distance wireless communication receiving environment monitoring unit operable to detect a change of receiving environment of the short distance wireless communication interface, wherein the wireless communication receiving environment monitoring unit activates the route discovery unit for getting the latest communication route in ad hoc network in response to the change of receiving environment of the short distance wireless communication interface;
- a route discovery transmission power determining unit operable to determine a transmission power to be used for transmitting a route request message which is used for getting the communication route to the destination device; and
- a route discovery transmission power changing unit operable to incrementally increase the transmission power to be used for transmitting the route request message when the route discovery unit fails to find the communication route to the destination device with the transmission power determined by the route discovery transmission power determining unit, wherein the route discovery transmission power determining unit determines a normal transmission power when the wireless communication device is requested to immediately send communication data to the destination device, and determines a transmission power lower than the normal transmission power when the wireless communication device is not requested to immediately send communication data to the destination device.

3. A method of acquiring a communication route to a destination device in an ad hoc network for a wireless communication device including a local wireless communication interface operable to establish the ad hoc network in at least one local area, and to perform communication with the destination device through the ad hoc network, a route discovery unit operable to discover the communication route to the destination device in the ad hoc network, and a wide area wireless communication interface operable to perform wide area wireless communication with a wide area wireless communication network,
the method comprising:
- monitoring receiving environment of the wide area wireless communication interface, and
- updating the communication route to the destination device to the latest communication route by activating the route discovery unit in response to a change of receiving environment of the wide area wireless communication interface; and
- determining a transmission power to be used for transmitting a route request message which is used for getting the communication route to the destination device, and
- incrementally increasing the transmission power when the route discovery unit fails to find the communication route to the destination device with the transmission power, wherein the determining further comprising:
- determining a normal transmission power when the wireless communication device is requested to immediately send communication data to the destination device, and
- determining a transmission power lower than the normal transmission power when the wireless communication device is not requested to immediately send communication data to the destination device.

4. A method of acquiring a communication route to a destination device in an ad hoc network for a wireless communication device including a local wireless communication interface operable to establish the ad hoc network in at least one local area, and to perform communication with the destination device through the ad hoc network, a route discovery unit operable to search the communication route to the destination device in the ad hoc network, and a short distance wireless communication interface operable to perform short distance wireless communication through a short distance wireless communication network different from that of the local wireless communication interface,
the method comprising:
- detecting a change of receiving environment of the short distance wireless communication interface,
- updating the communication route to the destination device to the latest communication route by activating the route discovery unit in response to the change of receiving environment of the short distance wireless communication interface; and
- determining a transmission power to be used for transmitting a route request message which is used for getting the communication route to the destination device, and incrementally increasing the transmission power to be used for transmitting the route request message when the route discovery unit fails to find the communication route to the destination device with the transmission power, wherein the determining further comprising:
- determining a normal transmission power when the wireless communication device is requested to immediately send communication data to the destination device, and
- determining a transmission power lower than the normal transmission power when the wireless communication device is not requested to immediately send communication data to the destination device.

* * * * *